(12) United States Patent
Ogasawara et al.

(10) Patent No.: US 9,405,162 B2
(45) Date of Patent: Aug. 2, 2016

(54) ACTIVE MATRIX DISPLAY DEVICE WITH AUXILIARY REPAIR LINE

(75) Inventors: Isao Ogasawara, Osaka (JP); Masahiro Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 326 days.

(21) Appl. No.: 14/237,511

(22) PCT Filed: Aug. 7, 2012

(86) PCT No.: PCT/JP2012/070067
§ 371 (c)(1),
(2), (4) Date: Feb. 6, 2014

(87) PCT Pub. No.: WO2013/021992
PCT Pub. Date: Feb. 14, 2013

(65) Prior Publication Data
US 2014/0184966 A1 Jul. 3, 2014

(30) Foreign Application Priority Data
Aug. 10, 2011 (JP) ................................. 2011-174663

(51) Int. Cl.
*G02F 1/1343* (2006.01)
*G02F 1/1362* (2006.01)
*G02F 1/1345* (2006.01)
*G02F 1/13* (2006.01)

(52) U.S. Cl.
CPC ........ *G02F 1/136286* (2013.01); *G02F 1/1309* (2013.01); *G02F 1/1345* (2013.01); *G02F 1/136259* (2013.01); *G02F 2001/136272* (2013.01)

(58) Field of Classification Search
CPC ................ G02F 1/1309; G02F 1/1345; G02F 1/136259; G02F 2001/136272; G02F 1/136286
See application file for complete search history.

(56) References Cited

U.S. PATENT DOCUMENTS

| 7,995,184 B2 | 8/2011 | Kim et al. | |
| 2005/0195338 A1 | 9/2005 | Matsumoto et al. | |
| 2010/0060559 A1* | 3/2010 | Nakagawa | G02F 1/1309 345/90 |
| 2014/0132873 A1 | 5/2014 | Ogasawara et al. | |

FOREIGN PATENT DOCUMENTS

| JP | 2003-222895 A | 8/2003 |
| JP | 2005-249993 A | 9/2005 |
| WO | 2013/011855 A1 | 1/2013 |

OTHER PUBLICATIONS

U.S. Appl. No. 14/232,407, filed Jan. 13, 2014.

* cited by examiner

*Primary Examiner* — Paisley L Arendt
(74) *Attorney, Agent, or Firm* — Chen Yoshimura LLP

(57) ABSTRACT

An active matrix display device is equipped with: a first auxiliary wiring line (700) that intersects a second common wiring line (230) through an insulation film, and that intersects with any of a plurality of first connecting wiring lines (900) through an insulating film; and a second auxiliary wiring line (710) that intersects, across an insulation film, any of a plurality of redundant portions (101), which are the other end portions of each of a plurality source wiring lines (100) and are located outside of a display region (60), and that, in a plan view, is positioned outside of a plurality of second lead-out wiring lines (250) and a first driver circuit, and is capable of being connected electrically to the second common wiring line (230). On each of the plurality of first connecting wiring lines (900), a plurality of intersections (901), where the first auxiliary wiring line (700) and the plurality of first connecting wiring lines (900) intersect, are located closer to the side of a plurality of source terminals (110, 120) than first obstructing portions.

8 Claims, 13 Drawing Sheets

ACTIVE MATRIX DISPLAY DEVICE WITH AUXILIARY REPAIR LINE

TECHNICAL FIELD

The present invention relates to an active matrix display device.

BACKGROUND ART

Among liquid crystal display devices, which are active matrix display devices, devices including auxiliary wiring lines are disclosed in the Related Art Documents of Japanese Patent Application Laid-Open Publication No. 2003-222895 (Patent Document 1) and Japanese Patent Application Laid-Open Publication No. 2005-249993 (Patent Document 2).

The liquid crystal display device disclosed in Patent Document 1 includes auxiliary wiring lines for repairing defects in the display region, the auxiliary wiring lines passing between the input and output terminals in a mounting region for an IC (integrated chip) on a TFT (thin film transistor) array substrate. The liquid crystal display device is also provided with through terminals, which are constituted of input terminals and output terminals electrically connected to each other in the IC, which drives the active matrix elements. Furthermore, the auxiliary wiring lines are connected to the output side of the through terminals, and collective pixel lines connected to respective RGB rows and used during image testing are connected to the input side of the through terminals.

Before mounting the IC that drives the active matrix elements, the collective pixel lines are cut by a laser or the like. After mounting the IC that drives the active matrix elements, the circuit is constituted only of wiring lines connected to the through terminals.

In the active matrix display device disclosed in Patent Document 2, inter-terminal shorting wiring lines that connect input wiring lines to the TFTs, to wiring lines on the FPC (flexible printed circuit) substrate are cut by laser irradiation. If there is an input wiring line to a TFT having a disconnection, then repair is performed on the cut inter-terminal shorting wiring line using a metal complex, or repair is performed by excluding some of the shorting wiring lines between input terminals from being irradiated with a laser and cutting the other shorting wiring lines between the input terminals.

RELATED ART DOCUMENT

Patent Documents

Patent Document 1: Japanese Patent Application Laid-Open Publication No. 2003-222895
Patent Document 2: Japanese Patent Application Laid-Open Publication No. 2005-249993

SUMMARY OF THE INVENTION

Problems to be Solved by the Invention

In the liquid crystal display device disclosed in Patent Document 1, paths corresponding to through terminals and terminals need to be formed in drivers such as mounted ICs. In the active matrix display device disclosed in Patent Document 2, repairs need to be conducted either by skipping the wiring lines when performing laser irradiation or by using a metal complex, which means that a complex repair method is required. If auxiliary wiring lines are provided outside of the active matrix substrate, then manufacturing cost becomes an issue.

The present invention takes into account the above-mentioned problem, and an object thereof is to provide an active matrix display device in which it is possible to perform repairs in a simple manner at an inexpensive manufacturing cost, and to simplify the configuration of the drivers to be mounted.

Means for Solving the Problems

An active matrix display device of the present invention includes: an active matrix substrate; a driver mounted on the active matrix substrate; and an external substrate electrically connected to the active matrix substrate. The active matrix substrate includes a plurality of second wiring lines that extend in parallel to each other in at least the display region, and that intersect with the plurality of first wiring lines across an insulating film. Also, the active matrix substrate has a plurality of first transmission terminals located in a terminal region towards the display region, the terminal region being located outside the display region on one end of the plurality of first wiring lines, the plurality of first transmission terminals being aligned in an extension direction of the plurality of second wiring lines and sending signals from the driver to the respective plurality of first wiring lines, and a plurality of second transmission terminals located in a terminal region towards the display region, the terminal region being located outside the display region on one end of the plurality of first wiring lines, the plurality of second transmission terminals being aligned in an extension direction of the plurality of second wiring lines and sending signals from the driver to the respective plurality of first wiring lines. Also, the active matrix substrate has a plurality of first lead-out wiring lines that respectively connect one end of the plurality of first wiring lines to the plurality of first transmission terminals, and a plurality of second lead-out wiring lines that respectively connect one end of at least some of the plurality of second wiring lines to the second transmission terminals located on the one end. Also, the active matrix substrate has a first driver circuit that is electrically connected to the plurality of second lead-out wiring lines, and that supplies signals to the at least some of the plurality of second wiring lines, and a plurality of output terminals that output a signal to the driver, located in the terminal region, on the side thereof opposite to the display region. Also, the active matrix substrate has a group of terminals located in the terminal region opposite to where the display region is located, the group of terminals including a plurality of input terminals to which a signal from the external substrate is inputted. Also, the active matrix substrate has a first common wiring line terminal included in the group of terminals by which a signal is inputted, the signal passing through the plurality of first transmission terminals, and a second common wiring line terminal included in the group of terminals by which a signal is inputted, the signal passing through the plurality of second transmission terminals connected to the second lead-out wiring lines. Also, the active matrix substrate has a first common wiring line connected to the first common wiring line terminal, the first common wiring line having a first extension portion that extends between the plurality of first transmission terminals and the plurality of output terminals, and a second common wiring line connected to the second common wiring line terminal, the second common wiring line have a second extension portion that extends between the plurality of second transmission terminals connected to the second lead-out wiring lines and the plurality of output terminals. Also, the active matrix substrate has a plurality of first connecting wiring lines provided between the respective plurality of first transmission terminals and the first extension portion of the first common wiring line, and a plurality of second connecting wiring lines provided between the respective plurality of second transmission terminals connected to the second lead-out wiring lines and the second extension portion of the second common wiring line. Also, the active matrix substrate has a first auxiliary wiring line that intersects with the second common wiring line across the insulating film, and that intersects with any of the plurality of first connecting wiring lines across the insulating film, and a second auxiliary wiring line that intersects across an insulating film with any of a plurality of redundant portions that are portions located on another side of the respective plurality of first wiring lines, that are located outside of the plurality of second lead-out wiring lines and the first driver circuit in a plan view, and that can connect electrically with the second common wiring line. Also, in the active matrix substrate, the plurality of first connecting wiring lines respectively have first obstructing portions therein that obstruct electrical connections between the plurality of first transmission terminals and the first common wiring line, and the plurality of second connecting wiring lines respectively have second obstructing portions therein that obstruct electrical connections between the plurality of second transmission terminals connected to the second lead-out wiring lines, and the second common wiring line. A plurality of intersections where the first auxiliary wiring line and the plurality of first connecting wiring lines intersect are located in each of the plurality of first connecting wiring lines closer to the plurality of first transmission terminals than the first obstructing portions are.

In one embodiment of the present invention, the active matrix substrate further has a plurality of third lead-out wiring lines connected to another end of at least some of the remaining plurality of second wiring lines that are not connected to the plurality of second lead-out wiring lines, and a second driver circuit that is electrically connected to the plurality of third lead-out wiring lines, and that supplies signals to the at least some of the plurality of second wiring lines. Also, the active matrix substrate further has a third common wiring line terminal included in the group of terminals by which a signal is inputted, the signal passing through the plurality of second transmission terminals connected to the third lead-out wiring lines, and a third common wiring line connected to the third common wiring line terminal, the third common wiring line having a third extension portion that extends between the plurality of second transmission terminals connected to the third lead-out wiring lines and the plurality of output terminals. Also, the active matrix substrate further has a plurality of third connecting wiring lines provided between the respective plurality of second transmission terminals connected to the third lead-out wiring lines and the third extension portion of the third common wiring line, and a third auxiliary wiring line that intersects with the third common wiring line across the insulating film, and that intersects with any of the plurality of first connecting wiring lines across the insulating film. Also, the active matrix substrate further has a fourth auxiliary wiring line that intersects across an insulating film with any of a plurality of redundant portions that are portions located on another side of the respective plurality of first wiring lines, that are located outside of the plurality of third lead-out wiring lines and the second driver circuit in a plan view, and that can connect electrically with the third common wiring line. The plurality of third connecting wiring lines respectively have third obstructing portions therein that obstruct electrical connections between the plurality of second transmission terminals connected to the third lead-out wiring lines, and the third common wiring line.

In one embodiment of the present invention, the active matrix substrate has a plurality of the first common wiring line terminals and a plurality of said first common wiring lines. The plurality of first common wiring line are respectively connected to the first common wiring line terminal, the first common wiring line having a first extension portion that extends between the plurality of first transmission terminals and the plurality of output terminals.

In one embodiment of the present invention, the second auxiliary wiring line is connected to the second common wiring line or intersects therewith across the insulating film.

In one embodiment of the present invention, the first obstructing portion is configured by providing a disconnected portion in each of the plurality of first connecting wiring lines.

In one embodiment of the present invention, the first connecting wiring line connected to a first wiring line having a disconnection among the plurality of first wiring lines is electrically connected to the first auxiliary wiring line that intersects with the first connecting wiring line by removing a portion of the insulating film interposed therebetween. The first auxiliary wiring line electrically connected to the first connecting wiring line is electrically connected to the second common wiring line that intersects with the first auxiliary wiring line by removing a portion of the insulating film interposed therebetween. The second common wiring line electrically connected to the first auxiliary wiring line is electrically connected to the second auxiliary wiring line. The second auxiliary wiring line is electrically connected to any of the plurality of redundant portions by removing a portion of the insulating film interposed therebetween. A signal from the driver inputted from the first transmission terminals is sent to both one end and another end of the first wiring line among the plurality of first wiring lines that is electrically connected to the first connecting wiring line connected to the first auxiliary wiring line.

In one embodiment of the present invention, the first connecting wiring line connected to a first wiring line having a disconnection among the plurality of first wiring lines is electrically connected to the third auxiliary wiring line that intersects with the first connecting wiring line by removing a portion of the insulating film interposed therebetween. The third auxiliary wiring line electrically connected to the first connecting wiring line is electrically connected to the third common wiring line that intersects with the third auxiliary wiring line by removing a portion of the insulating film interposed therebetween. The third common wiring line electrically connected to the third auxiliary wiring line is electrically connected to the fourth auxiliary wiring line. The fourth auxiliary wiring line is electrically connected to any of the plurality of redundant portions by removing a portion of the insulating film interposed therebetween. A signal from the driver inputted from the first transmission terminals is sent to both one end and another end of the first wiring line among the plurality of first wiring lines that is electrically connected to the first connecting wiring line connected to the third auxiliary wiring line.

In one embodiment of the present invention, the second auxiliary wiring line and the fourth auxiliary wiring line are connected to so as not to overlap the plurality of redundant portions or intersects with the plurality of redundant portions.

Effects of the Invention

According to the present invention, it is possible to perform repairs with ease at an inexpensive manufacturing cost, and to simplify the configuration of the drivers to be mounted.

DETAILED DESCRIPTION OF EMBODIMENT

Figure 1:
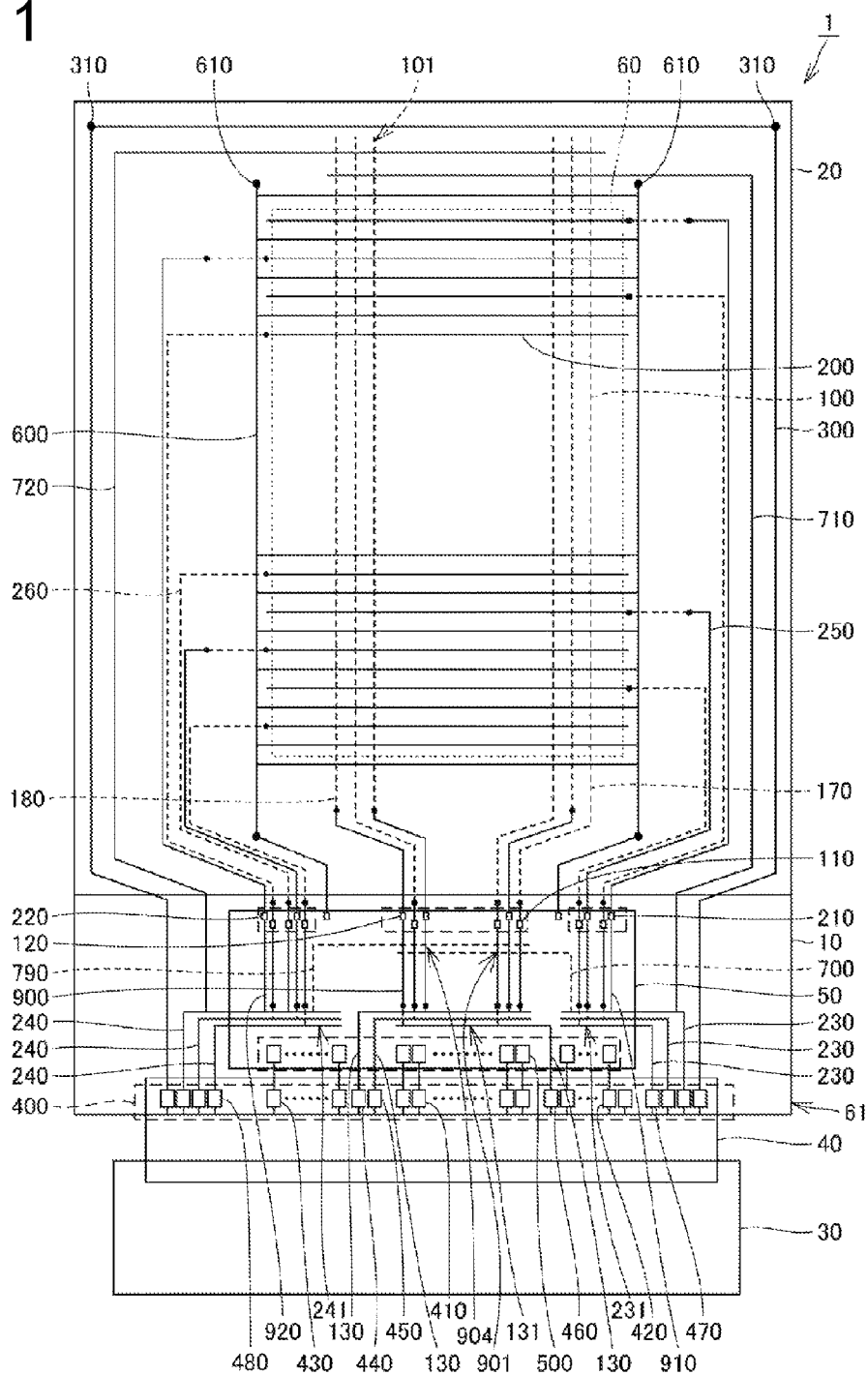
FIG. 1 is a plan view showing a configuration of an active matrix display device according to Embodiment 1 of the present invention.

Below, an active matrix display device of Embodiment 1 of the present invention will be explained. In the descriptions for embodiments below, identical or corresponding portions in the respective drawings are given the same reference characters, and descriptions thereof will not be repeated. In the explanations of the embodiments, the expressions up, down, left, and right are used for convenience of explanation, but these expressions are based on the figures that are shown and do not limit the configurations of the present invention.

In the embodiments below, a liquid crystal panel will be described as an example of a display panel included in an active matrix display device, but the present invention can also be applied to display devices other than liquid crystal panels such as a microcapsule-type electrophoretic electronic paper, an organic EL (electroluminescence) display, and an inorganic EL display.

Embodiment 1

FIG. 1 is a plan view showing a configuration of an active matrix display device according to Embodiment 1 of the present invention. In FIG. 1, wiring lines formed in the gate electrode layer of the TFTs are depicted with solid lines, and wiring lines formed in the source/drain electrode layer of the TFTs are depicted with dotted lines. In the state shown in FIG. 1, obstructing portions to be mentioned later are not formed.

As shown in FIG. 1, the active matrix display device 1 according to the present embodiment includes an active matrix substrate 10, and an opposite substrate 20 facing the active matrix substrate 10. A liquid crystal material that is not shown is sandwiched between the active matrix substrate 10 and the opposite substrate 20.

The active matrix display device 1 includes a driver 50 mounted on the active matrix substrate 10, and an FPC 40 and a circuit substrate 30, which are external substrates electrically connected to the active matrix substrate 10.

In the active matrix display device 1 of the present embodiment, the active matrix substrate 10 and the circuit substrate 30 are electrically connected to each other through an FPC 40, but the active matrix display device 1 may be connected to only either of the FPC 40 or the circuit substrate 30.

In the opposite substrate 20 of the present embodiment, a color filter layer including R (red), G (green), and B (blue) color filters and a black matrix that prevents light leakage between these color filters is formed. A common electrode is formed on the color filter layer.

The active matrix substrate 10 is provided with a display region 60 located substantially in the center of the active matrix substrate 10, and a terminal region 61 located towards the bottom of FIG. 1 in which a plurality of input terminals are disposed. The terminal region 61 is a region of the active matrix substrate 10 that does not face the opposite substrate 20 when the active matrix substrate 10 and the opposite substrate 20 are bonded together with the liquid crystal material, which is not shown, therebetween.

The active matrix substrate 10 is provided with a plurality of source wiring lines 100 that are first wiring lines extending in parallel with each other at least in the display region 60, and a plurality of gate wiring lines 200 that are second wiring lines that extend in parallel with each other in the display region 60 and that intersect with the plurality of source wiring lines 100 across an insulating film. The insulating film is made of a material such as $SiN_x$ or $SiO_x$.

FIG. 1 shows only some of the plurality of source wiring lines 100 and plurality of gate wiring lines 200. The number of source wiring lines 100 and the number of gate wiring lines 200 are respectively set appropriately.

In the present embodiment, the plurality of source wiring lines 100 are formed for each color RGB in the display region 60. In other words, in the display region 60, there are source wiring lines 100 for R, source wiring lines 100 for G, and source wiring lines 100 for B. However, the configuration is not limited thereto in the case of monochrome liquid crystal panels.

Besides the plurality of source wiring lines 100 and the plurality of gate wiring lines 200, the display region 60 also has formed therein storage capacitance wiring lines. The storage capacitance wiring lines are formed in the display region 60 so as to be parallel to the plurality of gate wiring lines 200.

In each of the intersections between the plurality of source wiring lines 100 and the plurality of gate wiring lines 200, a switching element such as a TFT or an MIM (metal insulator metal) that is not shown, a pixel electrode (R, G, or B), which is not shown, that is connected to the switching element, and the like are formed.

The terminal region 61 is located outside of the display region 60, on one end (lower side in drawing) of the plurality of source wiring lines 100. The display region 60 side of the terminal region 61 is provided with a plurality of right-side source terminals 110 and a plurality of left-side source terminals 120 that are a plurality of first transmission terminals that respectively send signals from the driver 50 to the plurality of source wiring lines 100. The plurality of right-side source terminals 110 and the plurality of left-side source terminals 120 are aligned in the extension direction of the plurality of wiring lines 200.

In order to connect the driver 50 to the terminal region 61, it is possible to use the COG (chip on glass) method. The driver 50 is provided with a first driver circuit and a second driver circuit that supply a signal to the gate wiring lines 200.

The first driver circuit is electrically connected to the plurality of second lead-out wiring lines 250, and supplies a signal to at least some of a plurality of gate wiring lines 200. The second driver circuit is electrically connected to a plurality of third lead-out wiring lines 260, and supplies a signal to at least some of the remaining plurality of gate wiring lines 200. However, the form of the first driver circuit and the second driver circuit is not limited thereto, and at least one of them may be formed monolithically on the active matrix substrate 10.

Also, the display region 60 side of the terminal region 61 is provided with a plurality of right-side gate terminals 210 and a plurality of left-side gate terminals 220 that are a plurality of second transmission terminals that respectively send a signal from the driver 50 to the plurality of gate wiring lines 200. The plurality of right-side gate terminals 210 and the plurality of left-side source terminals 220 are aligned in the extension direction of the plurality of gate wiring lines 200.

The plurality of right-side source terminals 110 and plurality of left-side source terminals 120, and one end of the plurality of source wiring lines 100 are respectively connected to each other by a plurality of right-side first lead-out wiring lines 170 and a plurality of left-side first lead-out wiring lines 180 that are a plurality of first lead-out wiring lines. For ease of explanation, the right-side source terminals 110 and the left-side source terminals 120 are described as separate parts, but the right-side source terminals 110 and the left-side source terminals 120 are functionally the same type of terminal.

Specifically, the plurality of right-side source terminals 110 and the plurality of source wiring lines 100 are connected through the plurality of right-side first lead-out wiring lines 170 such that one right-side source terminal 110 corresponds one-to-one to one source wiring line 100.

Also, the plurality of left-side source terminals 120 and the plurality of source wiring lines 100 are connected through the plurality of left-side first lead-out wiring lines 180 such that one left-side source terminal 120 corresponds one-to-one to one source wiring line 100.

The plurality of right-side gate terminals 210 and one end of some of the plurality of gate wiring lines 200 are respectively connected to each other through a plurality of second lead-out wiring lines 250. The plurality of left-side gate terminals 220 and the other end of the remainder of the plurality of gate wiring lines 200 not connected to the plurality of second lead-out wiring lines 250 are respectively connected to each other through a plurality of third lead-out wiring lines 260.

In the present embodiment, some of the plurality of gate wiring lines 200 and the remainder of the plurality of gate wiring lines 200 are formed alternately and parallel to each other. However, the connective configuration of the gate wiring lines and the lead-out wiring lines is not limited thereto, and a configuration may be used in which some of the plurality of gate wiring lines 200 are in the upper half of the display region 60, and the remainder of the plurality of gate wiring lines 200 are in the lower half of the display region 60, for example.

The plurality of right-side gate terminals 210 and the plurality of gate wiring lines 200 are connected to each other through the plurality of second lead-out wiring lines 250 such that one right-side gate terminal 210 corresponds to one gate wiring line 200.

Also, the plurality of left-side gate terminals 220 and the plurality of gate wiring lines 200 are connected to each other through the plurality of third lead-out wiring lines 260 such that one left-side gate terminal 220 corresponds to one gate wiring line 200.

A plurality of output terminals 500 that output a signal to the driver 50 are provided in the terminal region 61, on the side thereof opposite to the display region 60. The plurality of output terminals 500 are aligned in the extension direction of the plurality of gate wiring lines 200.

A group of terminals 400 including a plurality of input terminals 410 that input signals from the FPC 40 or the circuit substrate 30 is provided in the terminal region 61, on the side thereof opposite to the display region 60 when viewed from the plurality of output terminals 500. The plurality of input terminals 410 are aligned in the extension direction of the plurality of gate wiring lines 200.

The group of terminals 400 includes a plurality of first common wiring line terminals 440, 450, and 460 for inputting a signal through the plurality of right-side source terminals 110 and the plurality of left-side source terminals 120.

Specifically, the first common wiring line terminal 440, the first common wiring line terminal 450, the plurality of input terminals 410, and the first common wiring line terminal 460 are provided in that order from the left of FIG. 1.

The group of terminals 400 includes a plurality of second common wiring line terminals 470 for inputting a signal through the right-side gate terminals 210 connected to the second lead-out wiring lines 250. The group of terminals 400 also includes a plurality of third common wiring line terminals 480 for inputting a signal through the left-side gate terminals 220 connected to the third lead-out wiring lines 260.

The plurality of first common wiring line terminals 440, 450, and 460 are respectively connected to the plurality of first common wiring lines 130. Each of the plurality of first common wiring lines 130 has a first extension portion 131 that extends so as to separate a plurality of right-side source terminals 110 and a plurality of left-side source terminals 120 from the plurality of output terminals 500.

The plurality of second common wiring line terminals 470 are respectively connected to the plurality of second common wiring lines 230. Each of the plurality of second common wiring lines 230 has a second extension portion 231 that extends between the plurality of right-side gate terminals 210 and the plurality of output terminals 500 so as to separate them.

The plurality of third common wiring line terminals 480 are respectively connected to the plurality of third common wiring lines 240. Each of the plurality of third common wiring lines 240 has a third extension portion 241 that extends between the plurality of left-side gate terminals 220 and the plurality of output terminals 500 so as to separate them.

Also, the group of terminals 400 includes a plurality of input terminals 410, 420, and 430 respectively connected to the plurality of output terminals 500.

Figure 2:
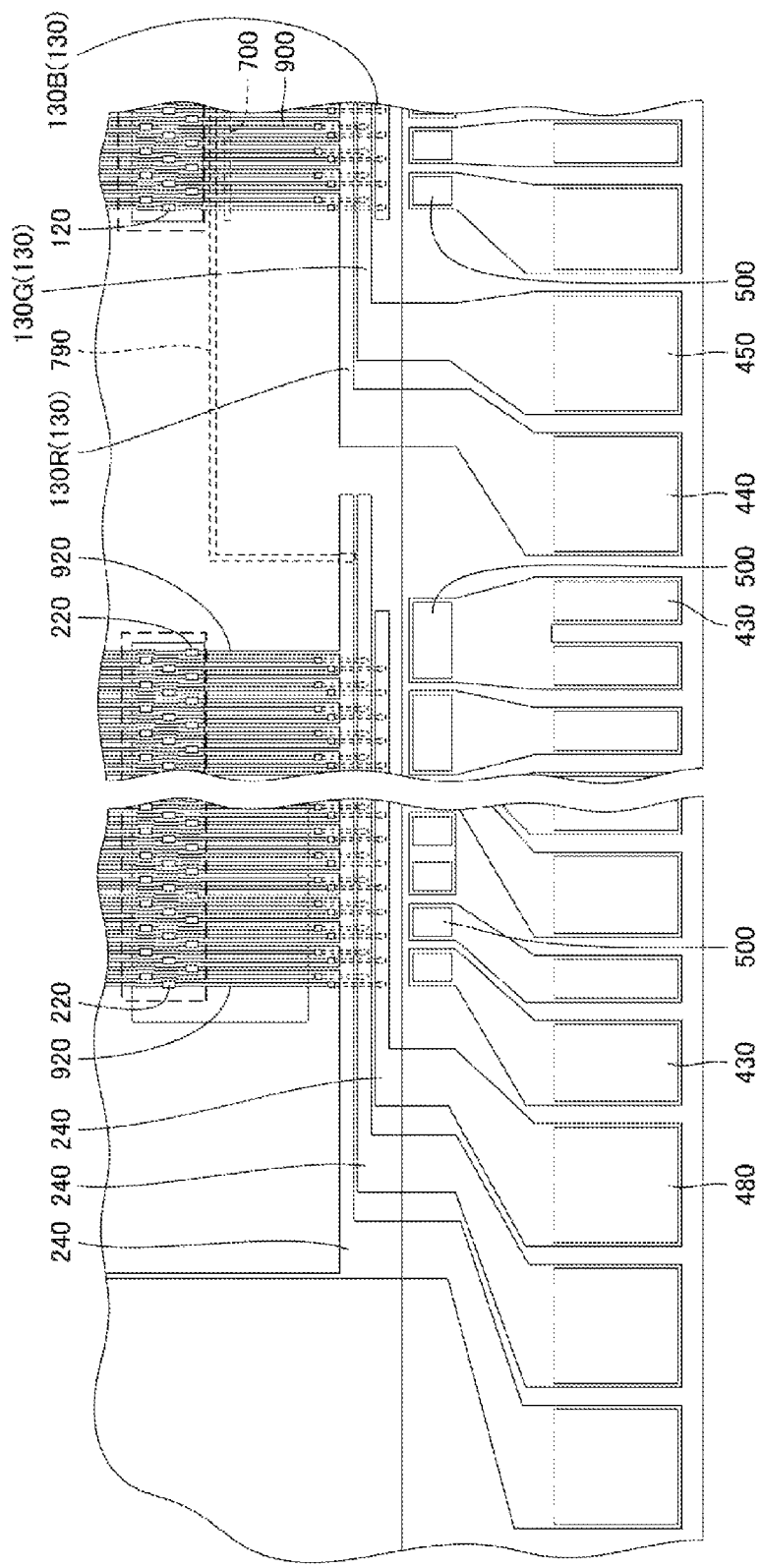
FIG. 2 is a partial magnified view showing a portion of a terminal region in the active matrix display device of the same embodiment.

FIG. 2 is a partial magnified view showing a portion of the terminal region in the active matrix display device of the present embodiment.

As shown in FIGS. 1 and 2, in the present embodiment, three first common wiring lines 130 are provided, and one first common wiring line 130 is connected to each of the plurality of first common wiring line terminals 440, 450, and 460.

Specifically, a red pixel common wiring line 130R is connected to the first common wiring line terminal 440. A green pixel common wiring line 130G is connected to the first common wiring line terminal 450. A blue pixel common wiring line 130B is connected to the first common wiring line terminal 460.

Three second common wiring lines 230 are provided and the three second common wiring line terminals 470 are each connected to one second common wiring line 230. Three third common wiring lines 240 are provided and the three third common wiring line terminals 480 are each connected to one third common wiring line 240.

Between the respective plurality of right-side source terminals 110 and plurality of left-side source terminals 120, and the first extension portions 131 of the plurality of first common wiring lines 130, a plurality of first connecting wiring lines 900 that are a plurality of connecting wiring lines are provided. During image scanning of the display region 60, the plurality of first connecting wiring lines 900 and the plurality of first common wiring lines 130 are electrically connected.

Between the respective plurality of right-side gate terminals 210, and the second extension portions 231 of the plurality of second common wiring lines 230, a plurality of second connecting wiring lines 910 that are a plurality of connecting wiring lines are provided. During image scanning of the display region 60, the plurality of second connecting wiring lines 910 and the plurality of second common wiring lines 230 are electrically connected.

Between the respective plurality of left-side gate terminals 220, and the third extension portions 241 of the plurality of third common wiring lines 240, a plurality of third connecting wiring lines 920 that are a plurality of connecting wiring lines are provided. During image scanning of the display region 60, the plurality of third connecting wiring lines 920 and the plurality of third common wiring lines 240 are electrically connected.

In the present embodiment, three first connecting wiring lines 900 that are respectively connected to three right-side source terminals 110 are respectively connected to different first common wiring lines 130. The three first connecting wiring lines 900 that are respectively connected to the three left-side source terminals 120 are respectively connected to different first common wiring lines 130.

The three first common wiring lines 130, after extending in the extension direction of the plurality of source wiring lines 100 from the three connected first common wiring line terminals 440, 450, and 460, change direction so as to extend in the extension direction of the plurality of gate wiring lines 200.

The three second connecting wiring lines 910 that are respectively connected to the three right-side gate terminals 210 are respectively connected to different second common wiring lines 230. The three third connecting wiring lines 920 that are respectively connected to the three left-side gate terminals 220 are respectively connected to different third common wiring lines 240.

The three second common wiring lines 230, after extending in the extension direction of the plurality of source wiring lines 100 from the three connected second common wiring line terminals 470, change direction so as to extend in the extension direction of the plurality of gate wiring lines 200.

The three third common wiring lines 240, after extending in the extension direction of the plurality of source wiring lines 100 from the three connected third common wiring line terminals 480, change direction so as to extend in the extension direction of the plurality of gate wiring lines 200.

Between the plurality of right-side source terminals 110 and plurality of left-side source terminals 120, and the plurality of output terminals 500, first auxiliary wiring lines 700 that intersect with the second common wiring lines 230 through an insulating film and that intersect with the plurality of first connecting wiring lines 900 through an insulating film are provided. The insulating film is made of the same material as the gate insulating film and is made of a material such as $SiN_X$ or $SiO_X$, for example.

In the present embodiment, one first auxiliary wiring line 700 is provided, and the one first auxiliary wiring line 700, after extending in the extension direction of the plurality of source wiring lines 100 from the second extension portion 231 of the one first common wiring line 230 that intersects therewith, changes direction and extends in the extension direction of the plurality of gate wiring lines 200.

The plurality of source wiring lines 100 have a plurality of redundant portions 101 that are portions on the other end of the respective source wiring lines 100 (upper side of FIG. 1), and that are located outside of the display region 60. On the active matrix substrate 10, a second auxiliary wiring line 710 is provided, the second auxiliary wiring line 710 intersecting with any of the plurality of redundant portions 101 across an insulating film, the second auxiliary wiring line 710 being located outside the path in which the plurality of second lead-out wiring lines 250 are electrically connected to the second common wiring line terminals 470, the second auxiliary wiring line 710 being able to be electrically connected to the second common wiring line terminals 470. In other words, the second auxiliary wiring lines 710 are located outside of the plurality of second lead-out wiring lines 250 and the first driver circuit in a plan view.

In the present embodiment, the second auxiliary wiring lines 710 are connected to one second common wiring line 230. The second auxiliary wiring line 710 intersects with redundant portions 101 of all source wiring lines 100 across an insulating film.

Also, between the plurality of right-side source terminals 110 and plurality of left-side source terminals 120, and the plurality of output terminals 500, a third auxiliary wiring line 790 that intersects with the third common wiring lines 240 through an insulating film and that intersects with any of the plurality of first connecting wiring lines 900 through an insulating film is provided.

In the present embodiment, one third auxiliary wiring line 790 is provided, and the one third auxiliary wiring line 790, after extending in the extension direction of the plurality of source wiring lines 100 from the third extension portion 241 of the one third common wiring line 240 that intersects therewith, changes direction and extends in the extension direction of the plurality of gate wiring lines 200.

On the active matrix substrate 10, a fourth auxiliary wiring line 720 is provided, the fourth auxiliary wiring line 720 intersecting with any of the plurality of redundant portions 101 across an insulating film, the fourth auxiliary wiring line 720 being located outside the path in which the plurality of third lead-out wiring lines 260 are electrically connected to the third common wiring line terminals 480, the fourth auxiliary wiring line 720 being able to be electrically connected to the third common wiring line terminals 480. In other words, the fourth auxiliary wiring line 720 is located outside of the plurality of third lead-out wiring lines 260 and the second driver circuit in a plan view.

In the present embodiment, one fourth auxiliary wiring line 720 is connected to one third common wiring line 240. Also, the one fourth auxiliary wiring line 720 intersects with the redundant portions 101 of all source wiring lines 100 across an insulating film.

An auxiliary capacitance wiring line 600 is provided so as to surround the display region 60. Transfer pads 610 are connected to the auxiliary capacitance wiring line 600.

A common electrode wiring line 300 is provided so as to surround the second auxiliary wiring line 710 and the fourth auxiliary wiring line 720. Common electrode terminals included in the group of terminals 400 are connected to the common electrode wiring line 300. Transfer pads 310 are also connected to the common electrode wiring line 300.

The transfer pads 310 are connected to a common electrode, which is not shown, formed on the opposite substrate 20. In this manner, a common voltage can be applied to the common electrode formed on the opposite substrate 20 from common electrode terminals. The common electrode does not necessarily need to be provided on the opposite substrate 20, and in a liquid crystal device using transverse electric fields, the common electrode is provided on the active matrix substrate 10.

A method of manufacturing a liquid crystal panel of the active matrix display device of the present embodiment will be described below. A step of testing to test the electrical connective state of the liquid crystal panel will be described in detail below.

First, on a transparent glass substrate, thin films such as a conductive film, an insulating film, a protective film, and an alignment film are stacked, and a base substrate for a plurality of active matrix substrates to be formed is made, the base substrate having active matrix substrate regions for active matrix substrates 10 to be cut out.

Next, on a transparent glass substrate, thin films such as a black matrix, color filters, a conductive film, and an alignment film are stacked, and a base substrate for a plurality of opposite substrates to be formed is made, the base substrate having opposite substrate regions for opposite substrates 20 to be cut out. A sealing material is coated onto one of the base substrates among the two base substrates. Then, after the sealing material has been coated, the two base substrates are bonded to each other.

The base substrates that have been bonded together are cut out as a motherboard from which a prescribed number of liquid crystal panels, each having an active matrix substrate 10 and an opposite substrate 20, are formed. In other words, the liquid crystal panel shown in FIG. 1 is one of the liquid crystal panels that have been cut from the motherboard after the liquid crystal material was injected. Therefore, other liquid crystal panels are present on the left and right of the liquid crystal panel of FIG. 1, for example, although they are not shown.

In each of the liquid crystal panels cut from the motherboard, the liquid crystal material is injected by vacuum injection, for example, through an injection hole formed between the active matrix substrate 10 and the opposite substrate 20. Drip injection may be used to inject the liquid crystal material instead of vacuum injection. In such a case, there is neither a need for an injection hole, nor for a step of sealing the injection hole portion.

Before attaching the driver 50 to the terminal region 61, a step of testing for testing the electrical connective state of the liquid crystal panel is performed. In the step of testing, testing is performed for disconnections in wiring lines, shorting, defects in pixel electrodes, or the like in the active matrix substrate 10 of the liquid crystal panel.

As a testing method, a testing probe is put into contact respectively with the plurality of first common wiring line terminals 440, 450, and 460, the plurality of second common wiring line terminals 470, and the plurality of third common wiring line terminals 480, for example, and a prescribed voltage is applied. There is no special limitation for the order in which the testing probe is put into contact with the plurality of first common wiring line terminals 440, 450, and 460, the plurality of second common wiring line terminals 470, and the plurality of third common wiring line terminals 480.

In this manner, a test signal that functions as a scanning signal is inputted to the respective plurality of gate wiring lines 200. The test signal is a signal that turns ON switching elements of respective pixels for a prescribed period of time. Also, a test signal functioning as a source signal is inputted to the respective plurality of source wiring lines 100. This test signal is a signal that causes liquid crystal around each pixel region to be oriented in a desired direction.

Thus, the switching element of each pixel is turned ON, and a test signal functioning as a source signal is inputted to each pixel electrode and a common signal is inputted to the common electrode. As a result, a prescribed voltage is applied to the liquid crystal layer, thereby controlling the orientation direction of the liquid crystal molecules, and if a light is radiated to the rear surface of the liquid crystal panel by an illumination device such as a backlight device, an image is displayed in the display screen of the liquid crystal panel corresponding to the display region 60 of the active matrix substrate 10.

Therefore, by visual inspection by an inspector, for example, of the display screen of the liquid crystal panel, it is possible to detect disconnections and shorting of wiring lines in the active matrix substrate 10 of the liquid crystal panel. An image detection device may be used in addition to or instead of visual inspection by an inspector, or a testing device that detects disconnections or shorting in the wiring lines electrically may be used.

Figure 3:
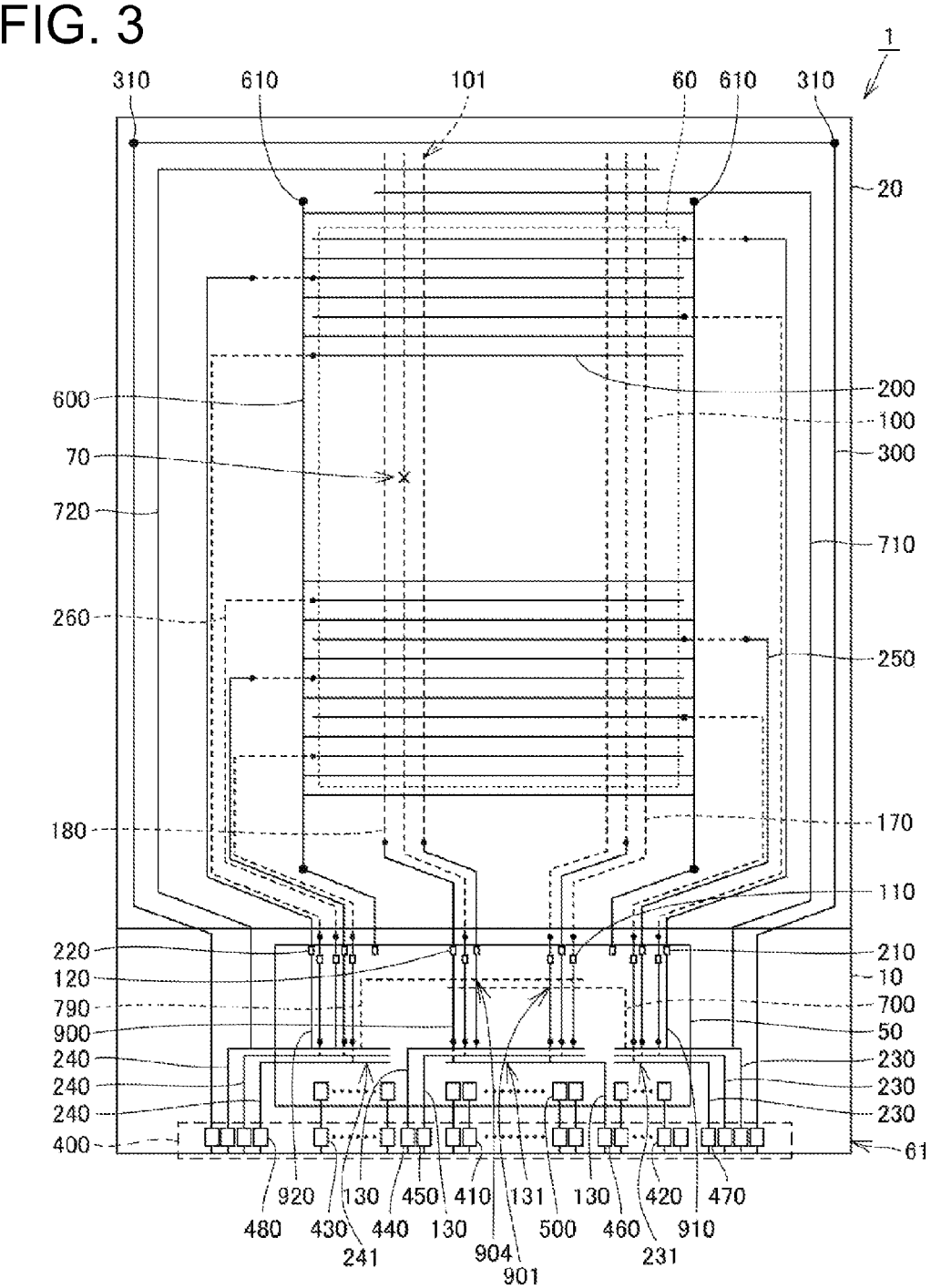
FIG. 3 is a plan view showing a state in which there is a disconnection in a source wiring line in a liquid crystal panel of the active matrix display device of the same embodiment.
Figure 4:
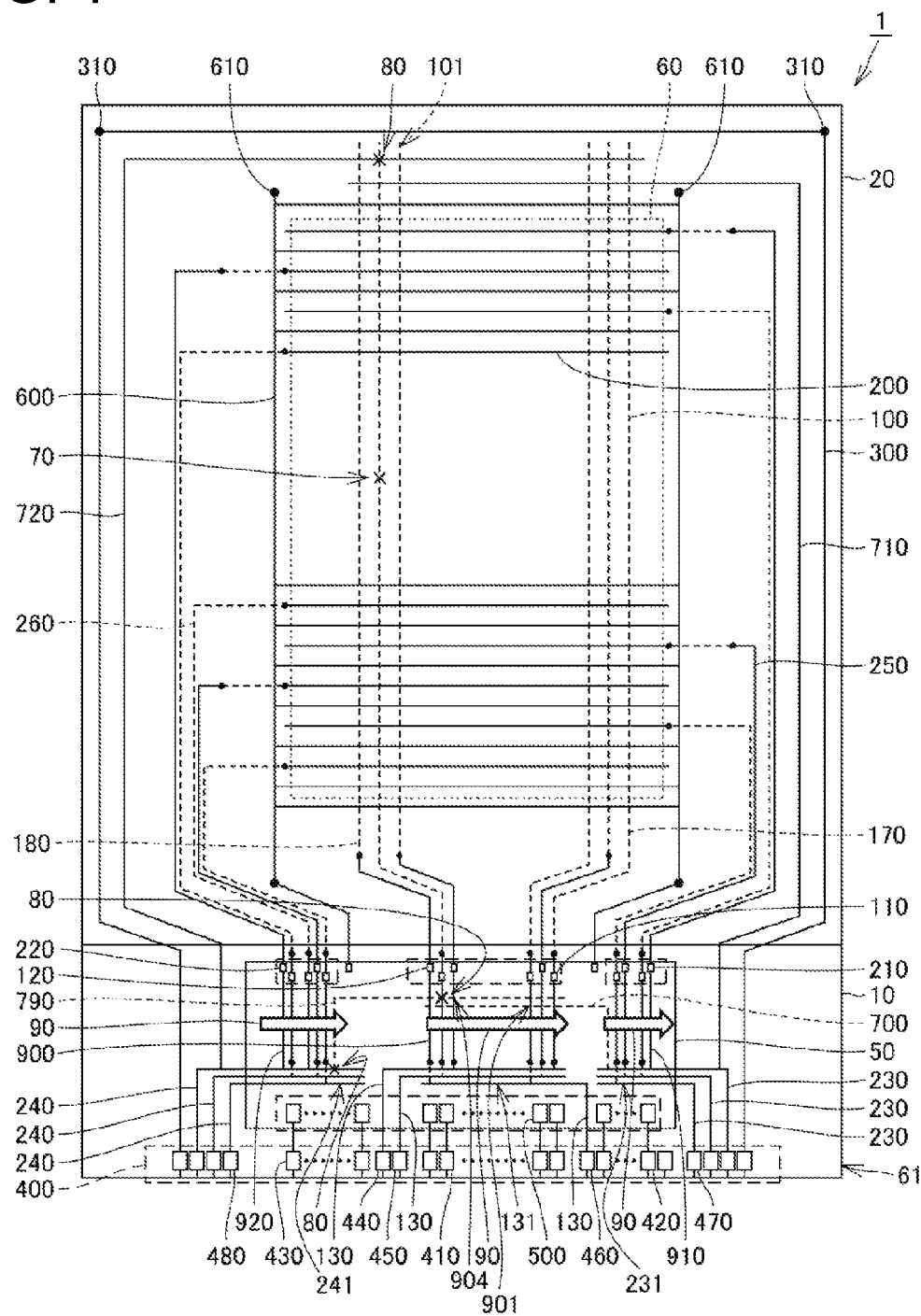
FIG. 4 is a plan view showing a state in which a laser beam is radiated on the liquid crystal panel of the active matrix display device of the same embodiment.
Figure 5:
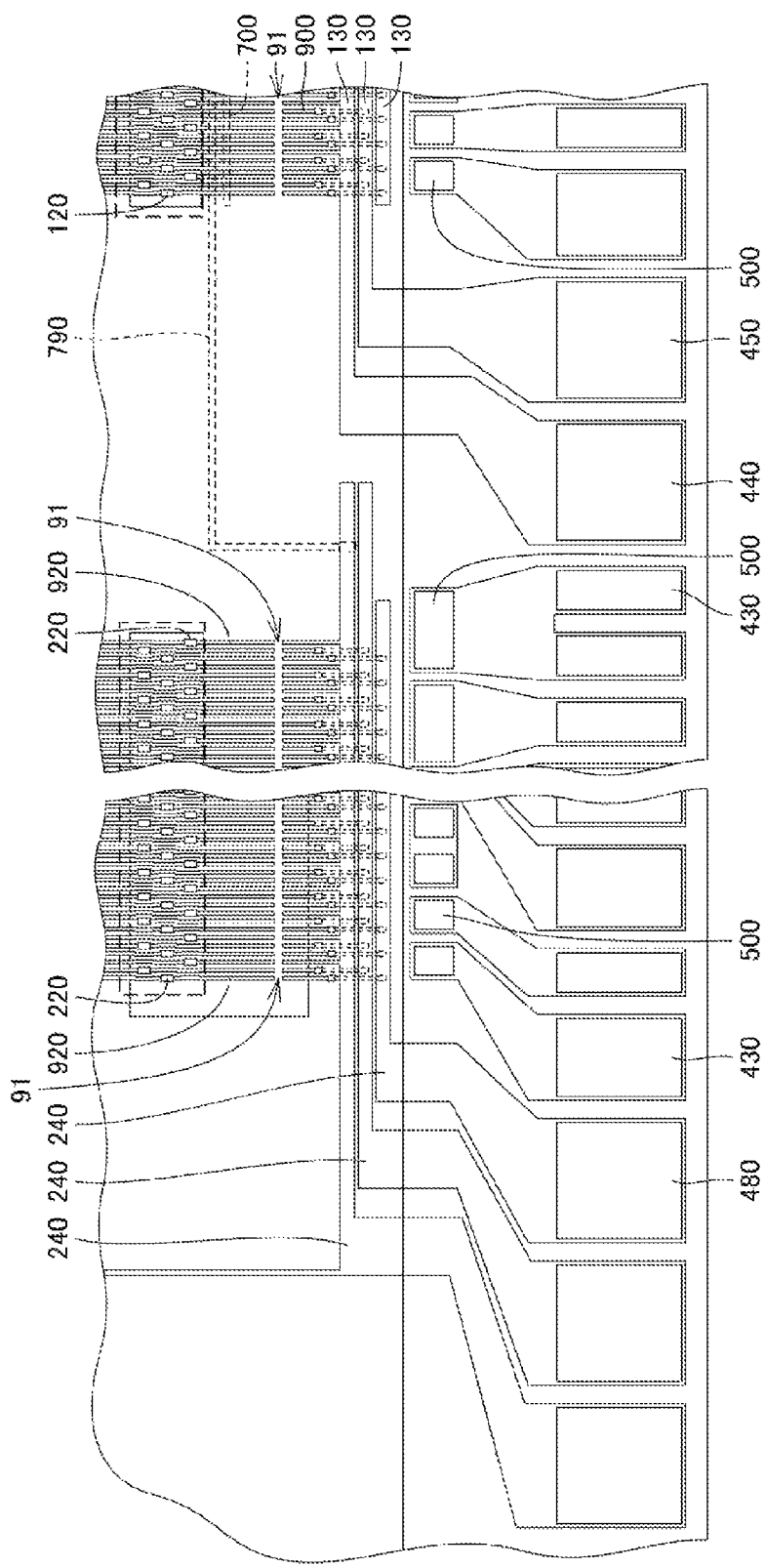
FIG. 5 is a partial plan view showing a disconnected portion formed by radiating a laser beam on the liquid crystal panel of the active matrix display device of the same embodiment.

FIG. 3 is a plan view showing a state in which there is a disconnection in a source wiring line in a liquid crystal panel of the active matrix display device of the present embodiment. FIG. 4 is a plan view showing a state in which a laser beam is radiated on the liquid crystal panel of the active matrix display device of the present embodiment. FIG. 5 is a partial plan view showing a disconnected portion formed by radiating a laser beam on the liquid crystal panel of the active matrix display device of the present embodiment.

As shown in FIG. 3, if a disconnection 70 is present in one source wiring line 100, then no test signal flows in the source wiring line 100 beyond the disconnection 70 (top portion in drawing) even if a test signal is inputted by putting a testing probe or the like in contact with the first common wiring line terminal 450.

In this case, a step of repair is performed in which laser beam is radiated to perform a repair. As shown in FIG. 4, a laser beam is radiated onto a target 80, which is an intersection between the first connecting wiring line 900 that is electrically connected to the source wiring line 100 having the disconnection 70, and the third auxiliary wiring line 790. By radiating a laser beam onto the target 80, the insulating film interposed therebetween is removed, and the third auxiliary wiring line 790 and the first connecting wiring line 900 are melted together and consequently connected to each other electrically.

Similarly, a laser beam is radiated onto a target 80 that is an intersection between the third auxiliary wiring line 790 that is electrically connected to the first connecting wiring line 900, and the third common wiring line 240. By radiating a laser beam onto the target 80, the insulating film interposed therebetween is removed, and the third auxiliary wiring line 790 and the third common wiring line 240 are melted together and consequently connected to each other electrically.

The third common wiring line 240, which is electrically connected to the third auxiliary wiring line 790, is connected to the third common wiring line terminal 480. A laser beam is radiated onto the target 80, which is the intersection between the fourth auxiliary wiring line 720 connected to the third common wiring line 240, which is connected to the third common wiring line terminal 480, and a redundant portion 101 of a source wiring line 100. By radiating a laser beam onto the target 80, the insulating film interposed therebetween is removed, and the fourth auxiliary wiring line 720 and the redundant portion 101 of the source wiring line 100 are melted together and consequently connected to each other electrically.

By radiating a laser beam onto the three targets 80 in this manner, a test signal inputted from the third common wiring line terminal 480 is sent to one end and the other end of the source wiring line 100 having the disconnection 70.

As a result, after the driver 50 is mounted, the signal from the driver 50 inputted from the left-side source terminal 120 is sent to one end and the other end of the source wiring line 100 having the disconnection 70.

This step of repair can be performed in the same step as trimming or turning pixels into dark spots, which are steps for repairing pixel defects, and no special addition of a step is required.

After the step of testing is finished, a step of cutting in which the plurality of first connecting wiring lines 900, the plurality of second connecting wiring lines 910, and the plurality of third connecting wiring lines 920 are cut. In the present embodiment, the step of cutting is performed after the step of repair, but the step of cutting may be performed before the step of repair but after the step of testing.

In the step of cutting, a laser beam is radiated along a line in the direction shown in the arrow 90 of FIG. 4, thereby cutting the plurality of first connecting wiring lines 900, the plurality of second connecting wiring lines 910, and the plurality of third connecting wiring lines 920.

In this manner, the plurality of right-side source terminals 110 and the plurality of first common wiring lines 130 are no longer electrically connected. The plurality of left-side source terminals 120 and the plurality of first common wiring lines 130 are no longer electrically connected. The plurality of right-side gate terminals 210 and the plurality of second common wiring lines 230 are no longer electrically connected. The plurality of left-side gate terminals 220 and the plurality of third common wiring lines 240 are no longer electrically connected.

As a result, the respective plurality of first connecting wiring lines 900 have therein disconnected portions 91 that are first obstructing portions that obstruct the electrical connection between the plurality of right-side source terminals 110 and plurality of left-side source terminals 120, and the plurality of first common wiring lines 130.

Similarly, the respective plurality of second connecting wiring lines 910 have therein disconnected portions 91 that are second obstructing portions that obstruct the electrical connection between the plurality of right-side gate terminals 210, and the plurality of second common wiring lines 230. The respective plurality of third connecting wiring lines 920 have therein disconnected portions 91 that are third obstructing portions that obstruct the electrical connection between the plurality of left-side gate terminals 220, and the plurality of third common wiring lines 240.

A plurality of intersections 901 where the first auxiliary wiring lines 700 and the plurality of first connecting wiring lines 900 intersect are located at each of the plurality of first connecting wiring lines 900 on the side of the disconnected portions 91 closer to the plurality of right-side source terminals 110 and plurality of left-side source terminals 120.

A plurality of intersections 904 where the third auxiliary wiring line 790 and the plurality of first connecting wiring lines 900 intersect are located at each of the plurality of first connecting wiring lines 900 on the side of the disconnected portions 91 closer to the plurality of right-side source terminals 110 and plurality of left-side source terminals 120.

After the step of cutting is finished, individual liquid crystal panels are cut out from the motherboard. After an optical film such as a polarizing plate is attached to the cut out liquid crystal panel, a step of mounting is performed in which the driver 50, which controls the driving of the plurality of source wiring lines 100 and the plurality of gate wiring lines 200, is mounted on terminal region 61.

In this manner, the liquid crystal panel is manufactured. The method of manufacturing the liquid crystal panel is not limited to the method above. For example, in a monochrome liquid crystal panel, color filters do not need to be layered on the opposite substrate 20. Also, a step of testing and a step of mounting may be performed after the individual liquid crystal panels are cut out.

According to the above-mentioned configuration, the electrical connection between the third auxiliary wiring line 790 and the first connecting wiring lines 900 is maintained even if all first connecting wiring lines 900, second connecting wiring lines 910, and third connecting wiring lines 920 are cut by radiating a laser beam along a line in the direction of the arrow 90 in FIG. 4.

As a result, it is not necessary to skip wiring lines to be cut by laser during the step of cutting, and thus, repair can be performed with ease. Also, by effectively using some of the first connecting wiring lines 900 as a portion of the repair path after cutting, there is no need to form a path connecting the input and output terminals in the mounted driver 50, and thus, the configuration of the mounted driver 50 can be simplified. By effectively using the common wiring line used as the input path for the test signal as a portion of the repair path, it is possible to prevent the area taken up by the repair path from being large.

In the active matrix substrate 10 of the present embodiment, the third auxiliary wiring line 790 and the fourth auxiliary wiring line 720 constitute the repair path. Thus, the third lead-out wiring line 260 does not intersect with the repair path. Therefore, the load capacity of the repair path can be reduced, and waveform rounding in the signal flowing through the repair path can be reduced.

Depending on where the source wiring line 100 with the disconnection is located, the first auxiliary wiring line 700 and the second auxiliary wiring line 710 may be used as the repair path.

Specifically, the first connecting wiring line 900 connected to the source wiring line 100 having the disconnection among the plurality of source wiring lines 100 is electrically connected to a first auxiliary wiring line 700 that intersects with the first connecting wiring line 900 by removing the portion of the insulating film therebetween.

The first auxiliary wiring line 700 electrically connected to the first connecting wiring line 900 is electrically connected to the second common wiring line 230 intersecting with this first auxiliary wiring line 700 by removing the portion of the insulating film therebetween.

The second common wiring line terminal 470 connected to the second common wiring line 230, which is electrically connected to the first auxiliary wiring line 700, is electrically connected to the second auxiliary wiring line 710. The second auxiliary wiring line 710, which is electrically connected to the second common wiring line terminal 470, is electrically connected to any of the plurality of redundant portions 101 by removing the portion of the insulating film therebetween.

A signal of the driver 50 inputted from the right-side source terminal 110 is sent to one end and the other end of the source wiring line 100, among the plurality of source wiring lines 100, that is electrically connected to the first connecting wiring line 900 connected to the first auxiliary wiring line 700.

In this case, the second lead-out wiring lines 250 do not intersect with the repair path. Thus, the load capacity of the repair path can be reduced, and waveform rounding in the signal flowing through the repair path can be reduced.

In the present embodiment, the disconnected portions 91 are provided as obstructing portions, but the configuration of the obstructing portions is not limited thereto, and the obstructing portions may be switching elements connected to the first connecting wiring lines 900, for example.

Furthermore, the first auxiliary wiring line 700 and the third auxiliary wiring line 790 are provided in the mounting region of the terminal region 61 where the driver 50 is mounted, and thus, there is no need to separately provide a space for the first auxiliary wiring line 700 and the third auxiliary wiring line 790, and it is possible to mitigate an increase in size of the liquid crystal panel.

Auxiliary wiring lines are not provided outside of the active matrix substrate 10, and thus, there is no need for a step to provide auxiliary wiring lines in the FPC 40 and the circuit substrate 30, and it is possible to manufacture the active matrix display device at a low cost.

The active matrix display device 1 may have a configuration in which the source wiring lines 100 and the gate wiring lines 200 are switched. In the present embodiment, both second lead-out wiring lines 250 and third lead-out wiring lines 260 are provided but a configuration may be used in which only one of them is provided.

Also, in the present embodiment, three first common wiring lines 130 are provided, but any number of first common wiring lines 130 may be provided as long as there is at least one. In the present embodiment, one first auxiliary wiring line 700 is provided, but any number of auxiliary wiring lines 700 may be provided as long as there is at least one, and the number of first auxiliary wiring lines 700 may be the same as the number of first common wiring lines 130.

Furthermore, in the present embodiment, the second auxiliary wiring line 710 and the second common wiring line 230 were connected to each other, but the second auxiliary wiring line 710 and the second common wiring line 230 may intersect across an insulating film. In this case, a laser beam is radiated onto a target 80 that is an intersection between the second auxiliary wiring line 710 and the second common wiring line 230. By radiating a laser beam onto the target 80, the portion of the insulating film interposed therebetween is removed, and the second auxiliary wiring line 710 and the second common wiring line 230 are melted together and consequently connected to each other electrically. Repair can be performed in this manner also.

In the present embodiment, the plurality of lead-out wiring lines on the active matrix substrate 10 sandwich an insulating layer, and are divided into a gate layer and a source/drain layer. Thus, compared to a case in which all wiring lines are formed in the same layer, it is possible to decrease the space between lead-out wiring lines adjacent to each other in a plan view. Thus, it is possible to reduce the area where the lead-out wiring lines are disposed on the active matrix substrate 10, and thus, it is possible to reduce the size of the active matrix display device 1.

The present invention can also be used for objects other than repairing disconnections. For example, the present invention can be used for wiring resistance management and defect analysis in the process of manufacturing the panel. When calculating wiring resistance and confirming a signal outputted from the driver, it is possible to calculate the wiring resistance or the signal outputted from the driver with ease by bringing a probe into contact with a common wiring line terminal in a state in which a specific wiring line is in contact with the auxiliary wiring line.

Also, by connecting the plurality of gate wiring lines or the plurality of source wiring lines to the common wiring lines through connecting wiring lines, it is possible to perform anti-static measures by dissipating a buildup of charge in the gate wiring lines and the source wiring lines.

Furthermore, the active matrix display device of the present embodiment is not limited to one in which a step of repair has been performed, but also includes ones in which a step of repair has not been performed.

Below, an active matrix display device of Embodiment 2 of the present invention will be explained. The active matrix display device 2 of the present embodiment differs from the active matrix display device 1 of Embodiment 1 only in the number of auxiliary wiring lines, and thus, descriptions of other components will not be repeated.

Embodiment 2

Figure 6:
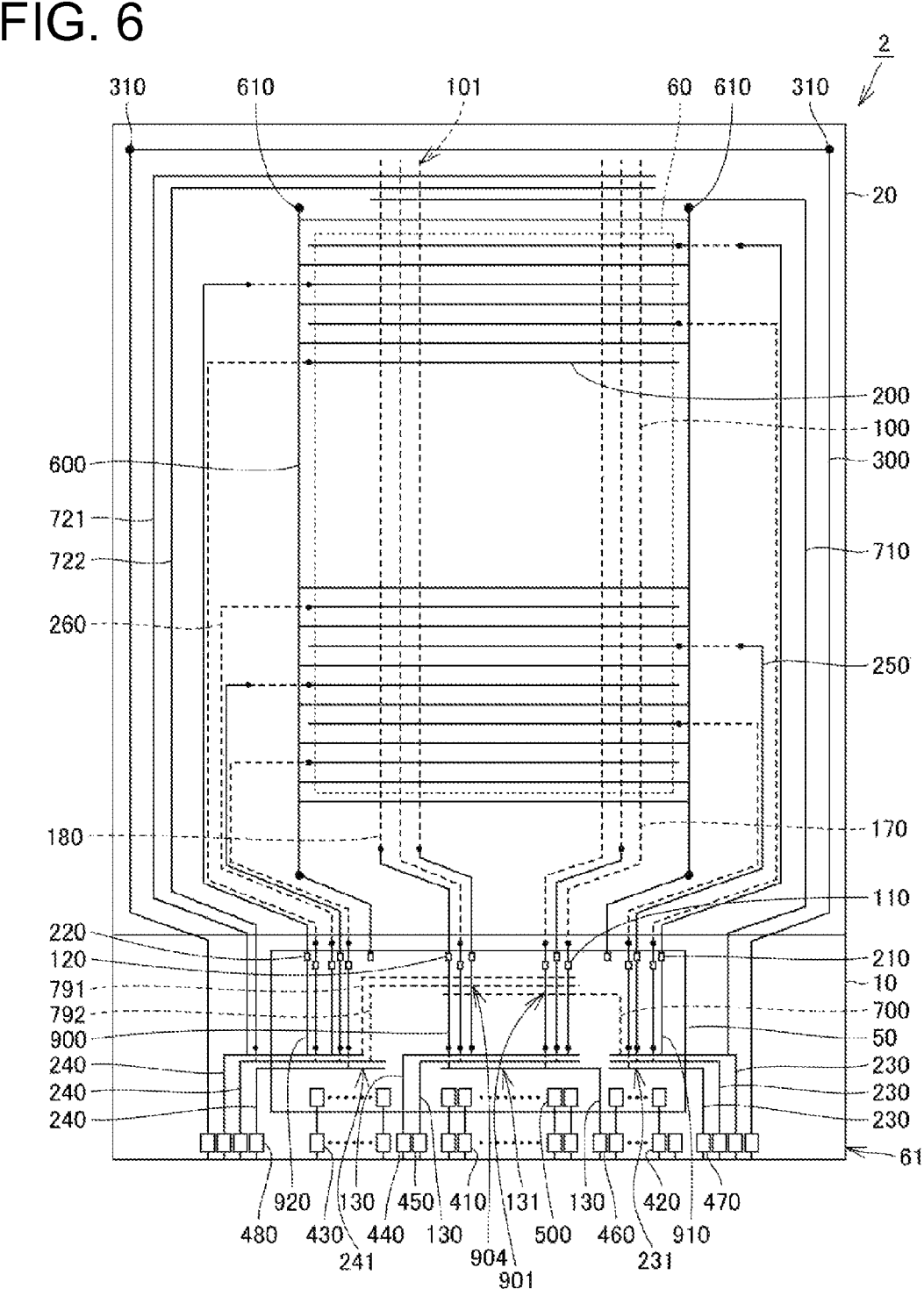
FIG. 6 is a plan view showing a configuration of an active matrix display device according to Embodiment 2 of the present invention.
Figure 7:
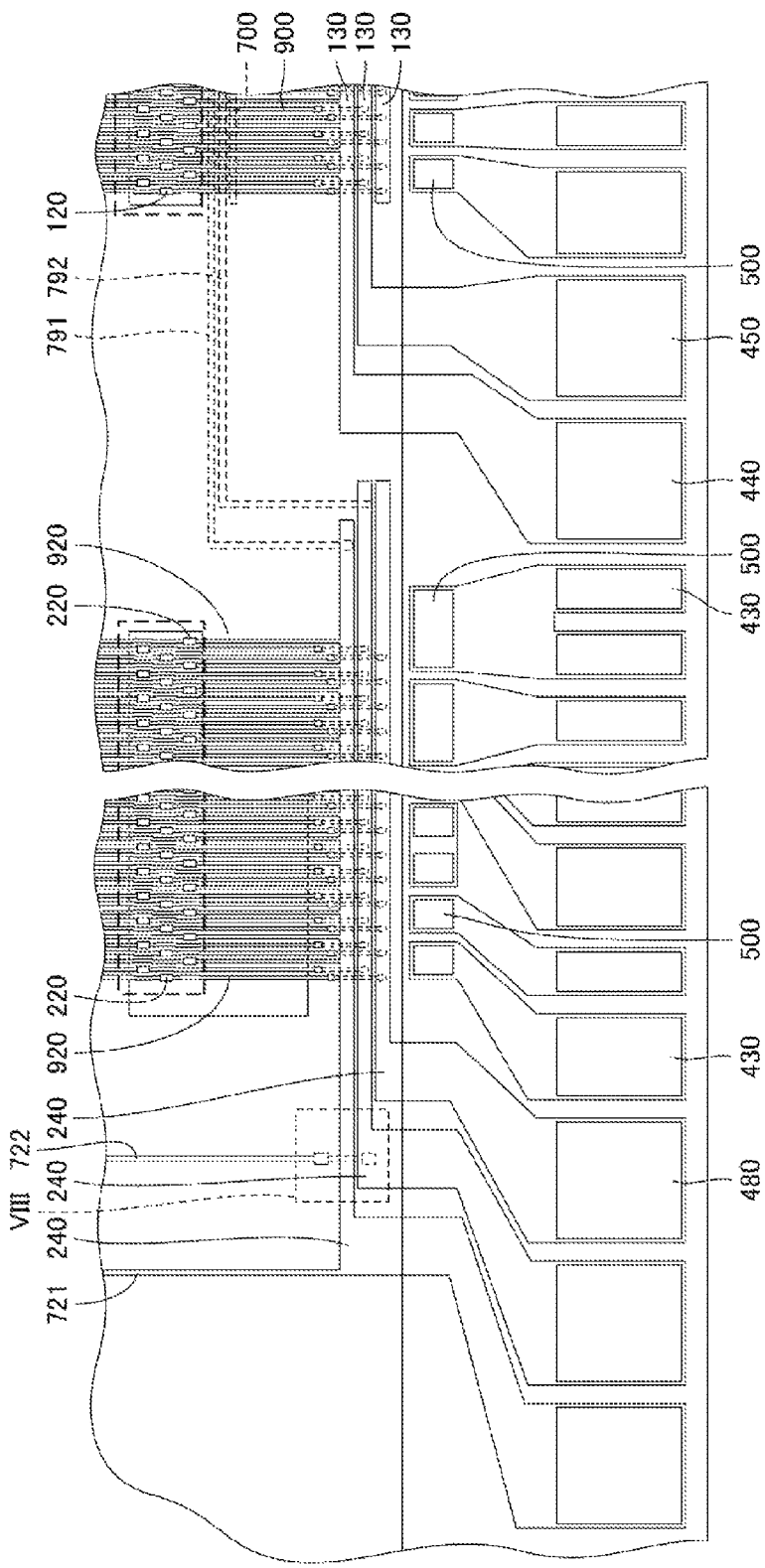
FIG. 7 is a partial magnified view showing a portion of a terminal region in the active matrix display device of the same embodiment.
Figure 8:
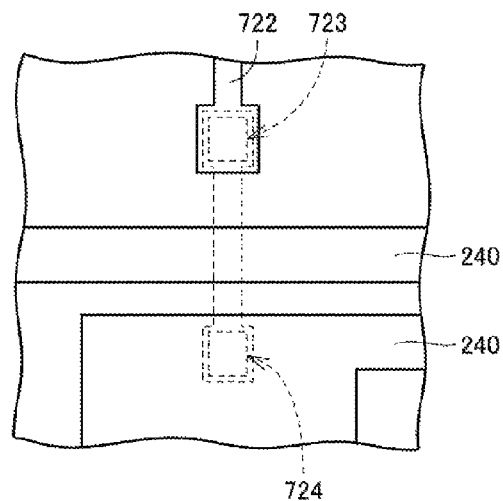
FIG. 8 is a partial magnified view of VIII in FIG. 7.
Figure 9:
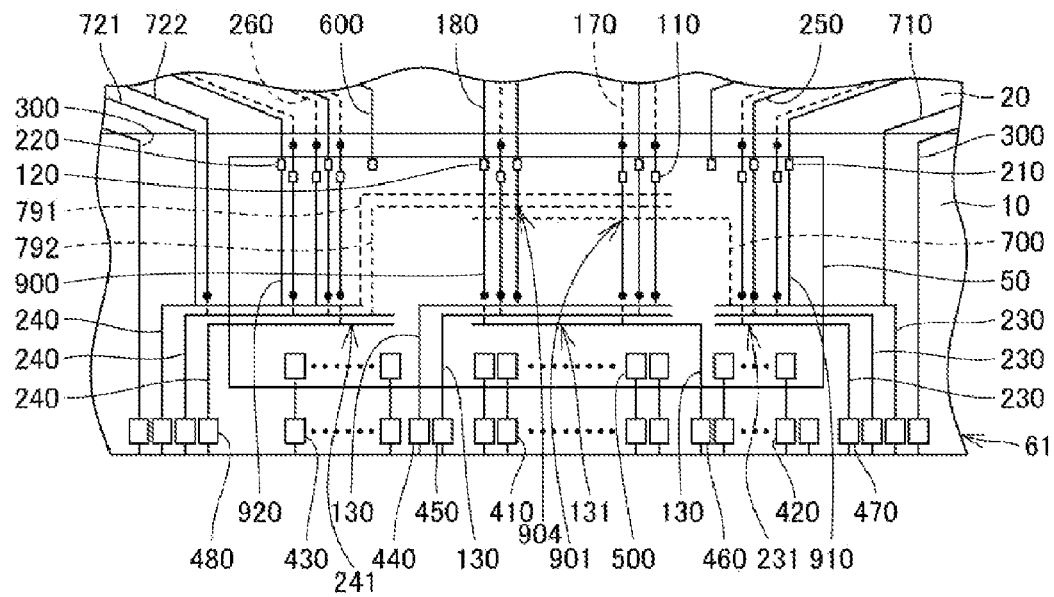
FIG. 9 is a partial plan view showing a portion of a terminal region in the active matrix display device of the same embodiment.

FIG. 6 is a plan view showing a configuration of an active matrix display device according to Embodiment 2 of the present invention. FIG. 7 is a partial magnified view showing a portion of the terminal region in the active matrix display device of the present embodiment. FIG. 8 is a partial magnified view of VIII in FIG. 7. FIG. 9 is a partial plan view showing a portion of the terminal region in the active matrix display device of the present embodiment.

In FIGS. 6 to 9, wiring lines formed in the gate electrode layer of the TFTs are depicted with solid lines, and wiring lines formed in the source/drain electrode layer of the TFTs are depicted with dotted lines. FIG. 6 shows a state prior to the formation of the first, second, and third obstructing portions. The first, second, and third obstructing portions are formed in a location similar to that of the active matrix display device 1 of Embodiment 1.

As shown in FIGS. 6 to 9, in an active matrix display device 2 of Embodiment 2 of the present invention, one each of a first auxiliary wiring line and second auxiliary wiring line are provided, and two each of third auxiliary wiring lines and fourth auxiliary wiring lines are provided.

Specifically, a left-side third auxiliary wiring line 791 located on the left and a right-side third auxiliary wiring line 792 located on the right are provided as third auxiliary wiring lines. The left-side third auxiliary wiring line 791 intersects with the third common wiring line 240, among the three third common wiring lines 240, with the uppermost third extension portion 241, across an insulating film. The right-side third auxiliary wiring line 792 intersects with the third common wiring line 240, among the three third common wiring lines 240, with the middle third extension portion 241, across an insulating film.

A left-side fourth auxiliary wiring line 721 located on the left and a right-side fourth auxiliary wiring line 722 located on the right are provided as fourth auxiliary wiring lines. The left-side fourth auxiliary wiring line 721 is connected to the third common wiring line 240, among the three third common wiring lines 240, with the uppermost third extension portion 241. The right-side fourth auxiliary wiring line 722 is connected to the third common wiring line 240, among the three third common wiring lines 240, with the middle third extension portion 241.

As shown in FIGS. 7 and 8, in order to connect the right-side fourth auxiliary wiring line 722 to the third common wiring line 240, the right-side fourth auxiliary wiring line 722 is formed so as to cross the third extension portion 241 of the third common wiring line 240 connected to the left-side fourth auxiliary wiring line 721.

In order to do so, the right-side fourth auxiliary wiring line 722 is disposed in the gate electrode layer of the TFT again through the source/drain electrode layer of the TFT from the gate electrode layer of the TFT through contact holes 723 and 724 formed such that the third extension portion 241 of the third common wiring line 240 is present therebetween.

Also, the length of the third extension portion 241 of the third common wiring line 240 connected to the left-side fourth auxiliary wiring line 721 is substantially the same as the length of the third extension portion 241 of the third common wiring line 240 connected to the right-side fourth auxiliary wiring line 722.

In this manner, the right-side third auxiliary wiring line 792 can be connected to the third common wiring line 240 without having the third extension portion 241 of the third common wiring line 240 connected to the left-side fourth auxiliary wiring line 721 intersect the right-side third auxiliary wiring line 792.

According to this configuration, it is possible to repair more source wiring lines 100 than in the active matrix display device 1 of Embodiment 1, and it is possible to reduce waveform rounding in the signal flowing through the repair path by reducing the load capacity of the repair path.

Below, an active matrix display device of Embodiment 3 of the present invention will be explained. The active matrix display device 3 of the present embodiment differs from the active matrix display device 1 of Embodiment 1 only in where the auxiliary wiring lines are disposed, and thus, descriptions of other components will not be repeated.

Embodiment 3

Figure 10:
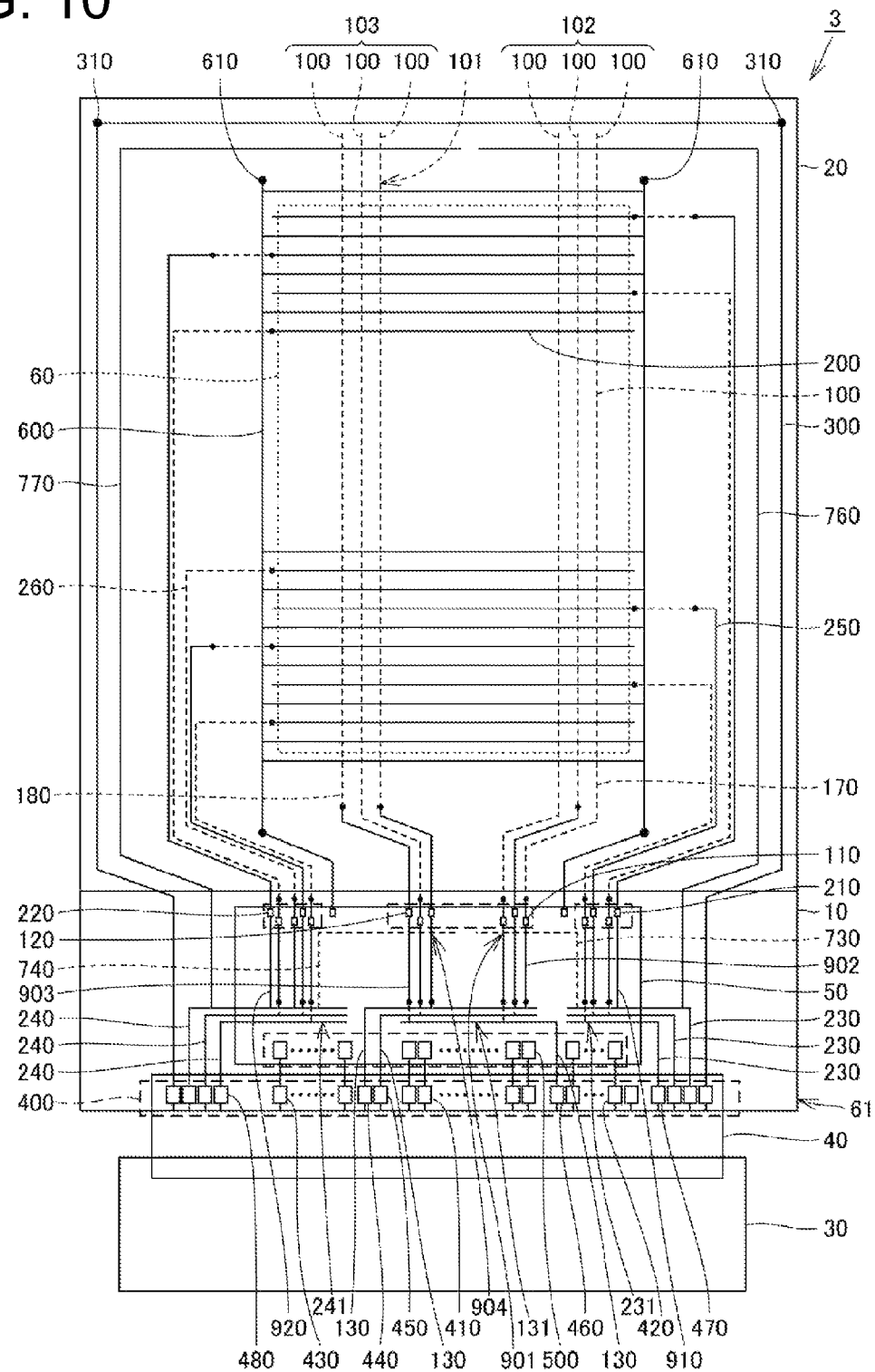
FIG. 10 is a plan view showing a configuration of an active matrix display device according to Embodiment 3 of the present invention.
Figure 11:
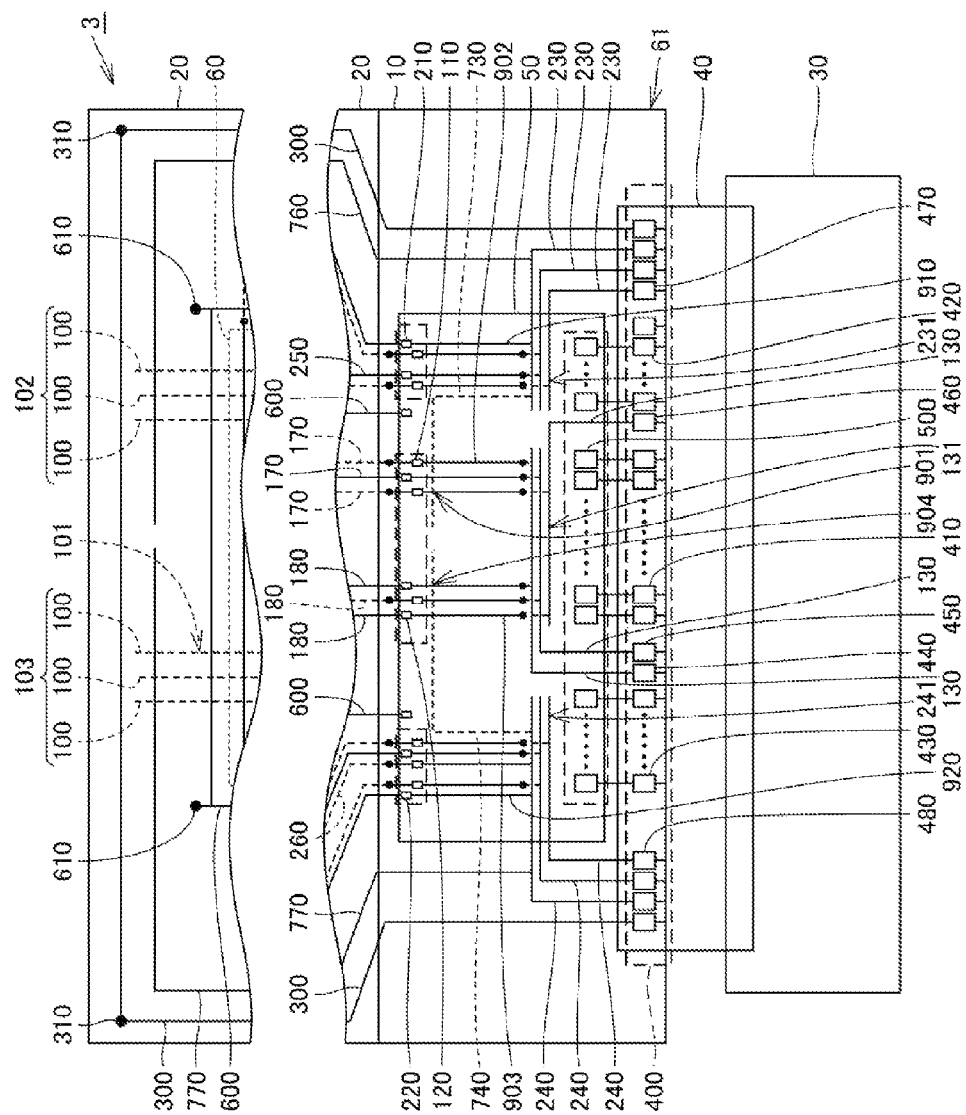
FIG. 11 is a partial magnified plan view showing a configuration of an active matrix display device according to the same embodiment.

FIG. 10 is a plan view showing a configuration of an active matrix display device according Embodiment 3 of the present invention. FIG. 11 is a partial magnified plan view showing a configuration of an active matrix display device according to the present embodiment.

In FIGS. 10 and 11, wiring lines formed in the gate electrode layer of the TFTs are depicted with solid lines, and wiring lines formed in the source/drain electrode layer of the TFTs are depicted with dotted lines. FIGS. 10 and 11 show a state prior to the formation of the first, second, and third obstructing portions. The first, second, and third obstructing portions are formed in a location similar to that of the active matrix display device 1 of Embodiment 1.

As shown in FIGS. 10 and 11, in an active matrix display device 3 according to Embodiment 3 of the present invention, a plurality of source wiring lines 100 are divided into two groups. Specifically, a right-side group of source wiring lines 102 located to the right of the drawings and a left-side group of source wiring lines 103 located to the left of the drawings are provided.

The plurality of source wiring lines 100 included in the right-side group of source wiring lines 102 are respectively connected to a plurality of right-side first lead-out wiring lines 170. The plurality of right-side first lead-out wiring lines 170 are respectively connected to the plurality of right-side source terminals 110.

The plurality of source wiring lines 100 included in the left-side group of source wiring lines 103 are respectively connected to a plurality of left-side first lead-out wiring lines 180. The plurality of left-side first lead-out wiring lines 180 are respectively connected to the plurality of left-side source terminals 120.

A plurality of first connecting wiring lines 900 include a right-side group of first connecting wiring lines 902 located on the right, and a left-side group of first connecting wiring lines 903 located on the left.

A first auxiliary wiring line 730, after extending in the extension direction of the plurality of source wiring lines 100 from the second extension portion 231 of the second common wiring line 230 that intersects therewith, changes direction to extend in the extension direction of the plurality of gate wiring lines 200.

A third auxiliary wiring line 740, after extending in the extension direction of the plurality of source wiring lines 100 from the third extension portion 241 of the third common wiring line 240 that intersects therewith, changes direction to extend in the extension direction of the plurality of gate wiring lines 200.

The first auxiliary wiring line 730 intersects only with the right-side group of first connecting wiring lines 902. In other words, the first auxiliary wiring line 730 does not intersect with the left-side group of first connecting wiring lines 903. The third auxiliary wiring line 740 intersects only with the left-side group of first connecting wiring lines 903. In other words, the third auxiliary wiring line 740 does not intersect with the right-side group of first connecting wiring lines 902.

The second auxiliary wiring line 760 intersects only with the plurality of source wiring lines 100 included in the right-side group of source wiring lines 102 in the redundant portion 101. The fourth auxiliary wiring line 770 intersects only with the plurality of source wiring lines 100 included in the left-side group of source wiring lines 103 in the redundant portion 101.

In other words, the second auxiliary wiring line 760 and the fourth auxiliary wiring line 770 intersect each other across an insulating film so as not to overlap each of the plurality of redundant portions 101.

In the present embodiment, the number of intersections 901 between the first auxiliary wiring line 700 and the plurality of first connecting wiring lines 900 can be reduced. The number of intersections 904 between the third auxiliary wiring line 740 and the plurality of first connecting wiring lines 900 can be reduced. Also, the number of intersections between the second auxiliary wiring line 760 and fourth auxiliary wiring line 770, and the plurality of source wiring lines 100 can be reduced. As a result, the load capacity of the repair path can be reduced, and waveform rounding in the signals flowing through the repair path can be reduced.

It is possible to reduce the area taken up by the wiring lines in the present embodiment compared to a configuration in which the second auxiliary wiring line 710 and the fourth auxiliary wiring line 720 intersect with all redundant portions 101 of the source wiring lines 100 as in the active matrix display device 1 of Embodiment 1. As a result, the outer form of the panel can be made smaller, and a wide laser radiation area can be ensured in the step of cutting.

Below, an active matrix display device 3a of a modification example of Embodiment 3 of the present invention will be explained.

Figure 12:
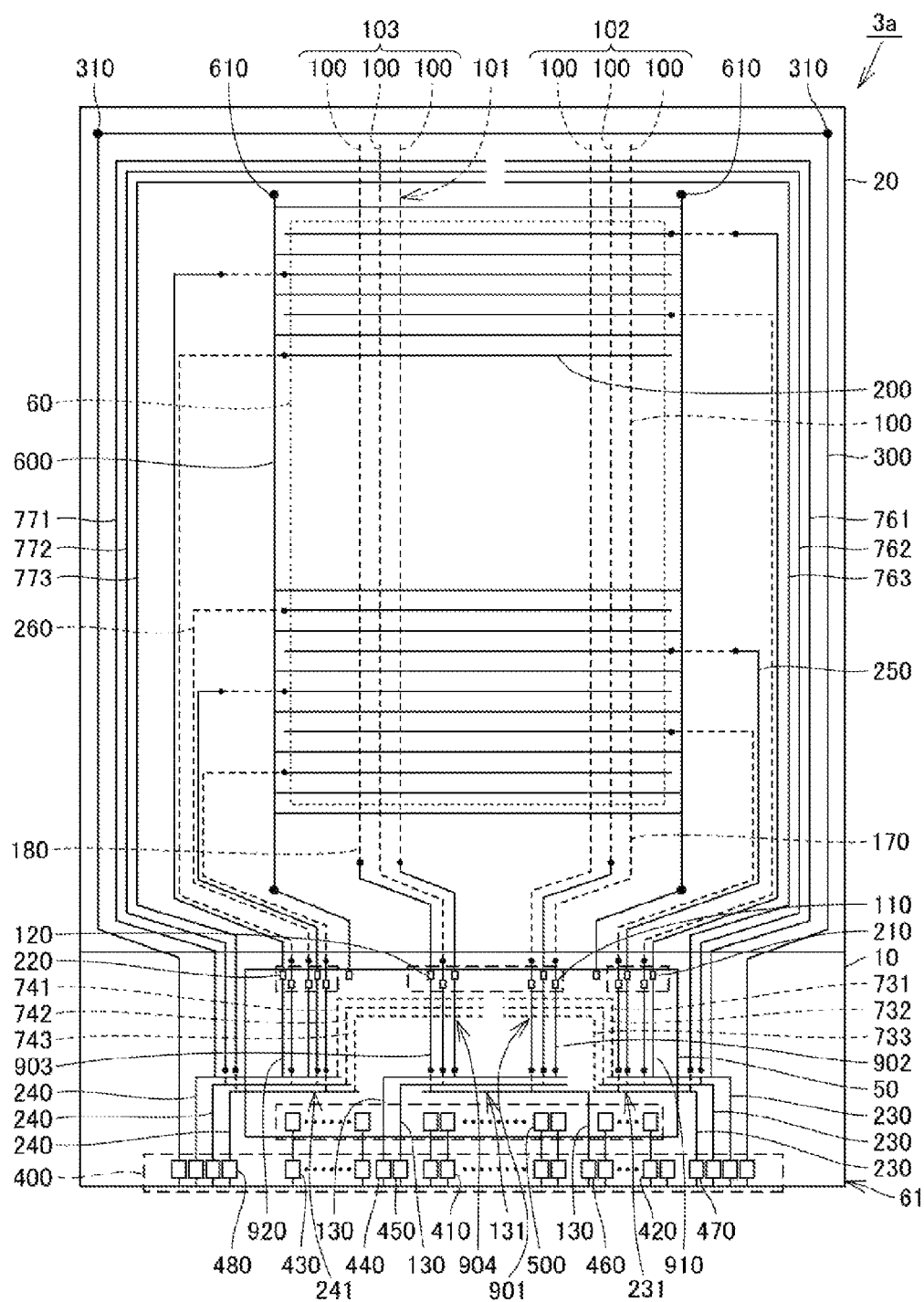
FIG. 12 is a plan view showing a configuration of an active matrix display device according to a modification example of the present embodiment.
Figure 13:
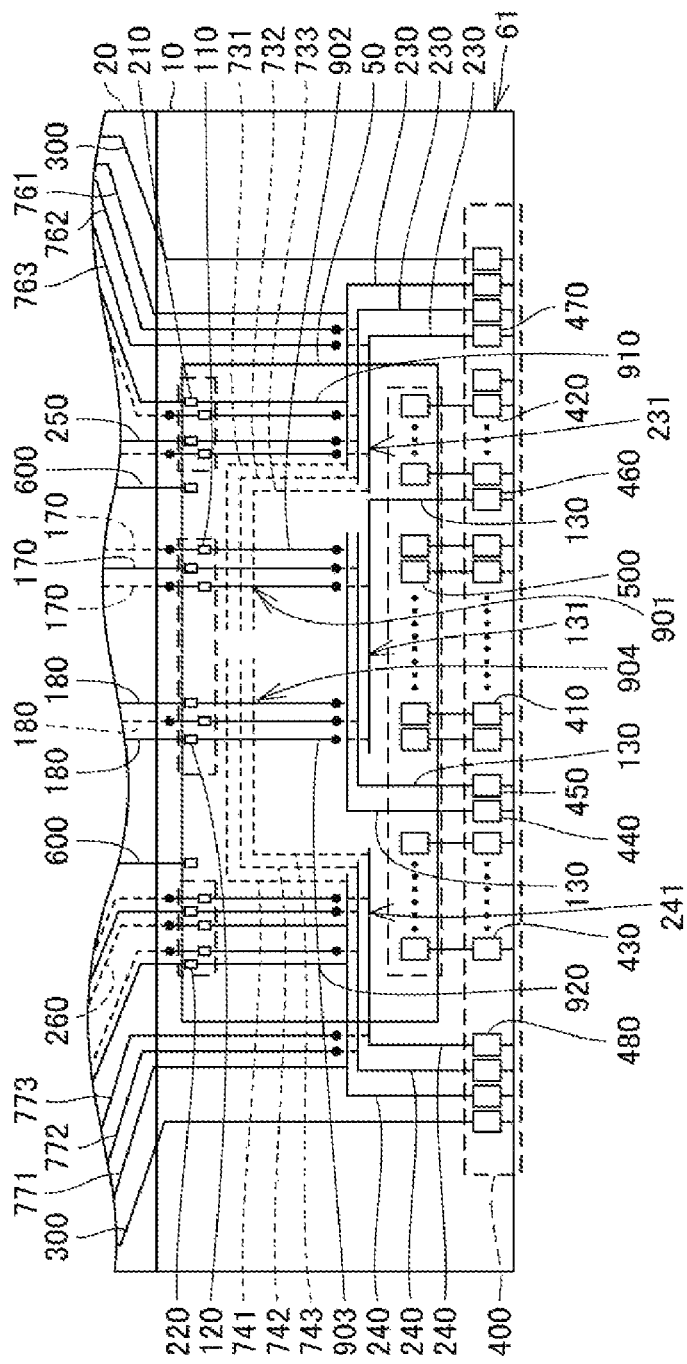
FIG. 13 is a partial magnified plan view showing a configuration of the active matrix display device according to the same modification example.

FIG. 12 is a plan view showing a configuration of an active matrix display device according to a modification example of the present embodiment. FIG. 13 is a partial magnified plan view showing a configuration of an active matrix display device according to the present modification example.

In FIGS. 12 and 13, wiring lines formed in the gate electrode layer of the TFTs are depicted with solid lines, and wiring lines formed in the source/drain electrode layer of the TFTs are depicted with dotted lines. FIGS. 12 and 13 show a state prior to the formation of the first, second, and third obstructing portions. The first, second, and third obstructing portions are formed in a location similar to that of the active matrix display device 1 of Embodiment 1.

The active matrix display device 3a of the present modification example differs from the active matrix display device 3 of Embodiment 3 only in the number of auxiliary wiring lines, and thus, descriptions of other components will not be repeated.

As shown in FIGS. 12 and 13, in the active matrix display device 3a of the present modification example, three each of the first auxiliary wiring lines and the second auxiliary wiring lines are provided, and three each of the third auxiliary wiring lines and the fourth auxiliary wiring lines are provided.

Specifically, a right-side first auxiliary wiring line 731 located to the right, a left-side first auxiliary wiring line 733 located to the left, and a middle first auxiliary wiring line 732 located between the right-side first auxiliary wiring line 731 and the left-side auxiliary wiring line 733 are provided as first auxiliary wiring lines.

The right-side first auxiliary wiring line 731, the left-side first auxiliary wiring line 733, and the middle first auxiliary wiring line 732, after extending in the extension direction of the plurality of source wiring lines 100 from the respective second extension portions 231 of the three second common wiring lines 230 intersecting therewith, change direction to extend in the extension direction of the plurality of gate wiring lines 200.

The right-side first auxiliary wiring line 731, the left-side first auxiliary wiring line 733, and the middle first auxiliary wiring line 732 intersect only with the right-side group of first connecting wiring lines 902. In other words, the right-side first auxiliary wiring line 731, the left-side first auxiliary wiring line 733, and the middle first auxiliary wiring line 732 do not intersect with the left-side group of first connecting wiring lines 903.

The lengths of the second extension portions 231 of the three second common wiring lines 230 are substantially the same. By doing so, the right-side first auxiliary wiring line 731, the left-side first auxiliary wiring line 733, and the middle first auxiliary wiring line 732 can be made to each intersect only one second common wiring line 230 across an insulating film.

In other words, the right-side first auxiliary wiring line 731, the left-side first auxiliary wiring line 733, and the middle first auxiliary wiring line 732 respectively intersect the position where the ends of the second extension portions 231 of the three second common wiring lines 230 are offset.

A left-side third auxiliary wiring line 741 located towards the left, a right-side third auxiliary wiring line 743 located towards the right, and a middle third auxiliary wiring line 742 located between the left-side third auxiliary wiring line 741 and the right-side third auxiliary wiring line 743 are provided as third auxiliary wiring lines.

The left-side third auxiliary wiring line 741, the right-side third auxiliary wiring line 743, and the middle third auxiliary wiring line 742, after extending in the extension direction of the plurality of source wiring lines 100 from the respective third extension portions 241 of the three third common wiring lines 230 intersecting therewith, change direction to extend in the extension direction of the plurality of gate wiring lines 200.

The left-side third auxiliary wiring line 741, the right-side third auxiliary wiring line 743, and the middle third auxiliary wiring line 742 intersect only with the left-side group of first connecting wiring lines 903. In other words, the left-side third auxiliary wiring line 741, the right-side third auxiliary wiring line 743, and the middle third auxiliary wiring line 742 do not intersect with the right-side group of first connecting wiring lines 902.

The lengths of the third extension portions 241 of the three third common wiring lines 240 are substantially the same. In this manner, the left-side third auxiliary wiring line 741, the right-side third auxiliary wiring line 743, and the middle third auxiliary wiring line 742 can be made to each intersect only one third common wiring line 240 across an insulating film.

In other words, the left-side third auxiliary wiring line 741, the right-side third auxiliary wiring line 743, and the middle third auxiliary wiring line 742 respectively intersect with the portion where the ends of the third extension portions 241 of the three third common wiring lines 240 are offset.

A right-side second auxiliary wiring line 761 located on the right, a left-side second auxiliary wiring line 763 located on the left, and a middle second auxiliary wiring line 762 located between the right-side second auxiliary wiring line 761 and the left-side second auxiliary wiring line 763 are provided as second auxiliary wiring lines.

The right-side second auxiliary wiring line 761, the left-side second auxiliary wiring line 763, and the middle second auxiliary wiring line 762 are each connected to only one of the three second common wiring lines 230. The connection is made through contact holes described in Embodiment 2.

The right-side second auxiliary wiring line 761, the left-side second auxiliary wiring line 763, and the middle second auxiliary wiring line 762 intersect only with the plurality of source wiring lines 100 included in the right-side group of source wiring lines 102 in the redundant portions 101.

A left-side fourth auxiliary wiring line 771 located to the left, a right-side fourth auxiliary wiring line 773 located to the right, and a middle fourth auxiliary wiring line 772 located between the left-side fourth auxiliary wiring line 771 and the right-side fourth auxiliary wiring line 773 are provided as fourth auxiliary wiring lines.

The left-side fourth auxiliary wiring line 771, the right-side fourth auxiliary wiring line 773, and the middle fourth auxiliary wiring line 772 are each connected to only one of the three third common wiring lines 240. The connection is made through contact holes described in Embodiment 2.

The left-side fourth auxiliary wiring line 771, the right-side fourth auxiliary wiring line 773, and the middle fourth auxiliary wiring line 772 intersect only with the plurality of source wiring lines 100 included in the left-side group of source wiring lines 103 in the redundant portions 101.

In other words, the right-side second auxiliary wiring line 761, the left-side second auxiliary wiring line 763, and the middle second auxiliary wiring line 762 intersect across an insulating film with the left-side fourth auxiliary wiring line 771, the right-side fourth auxiliary wiring line 773, and the middle fourth auxiliary wiring line 772 so as not to overlap the plurality of redundant portions 101.

According to this configuration, it is possible to perform repair on more source wiring lines 100 than in the active matrix display device 3 of Embodiment 3.

Below, an active matrix display device of Embodiment 4 of the present invention will be explained. The active matrix display device 4 of the present embodiment differs from the active matrix display device 1 of Embodiment 1 only in that it is possible to repair the gate wiring lines, and thus, descriptions of other components will not be repeated.

Embodiment 4

Figure 14:
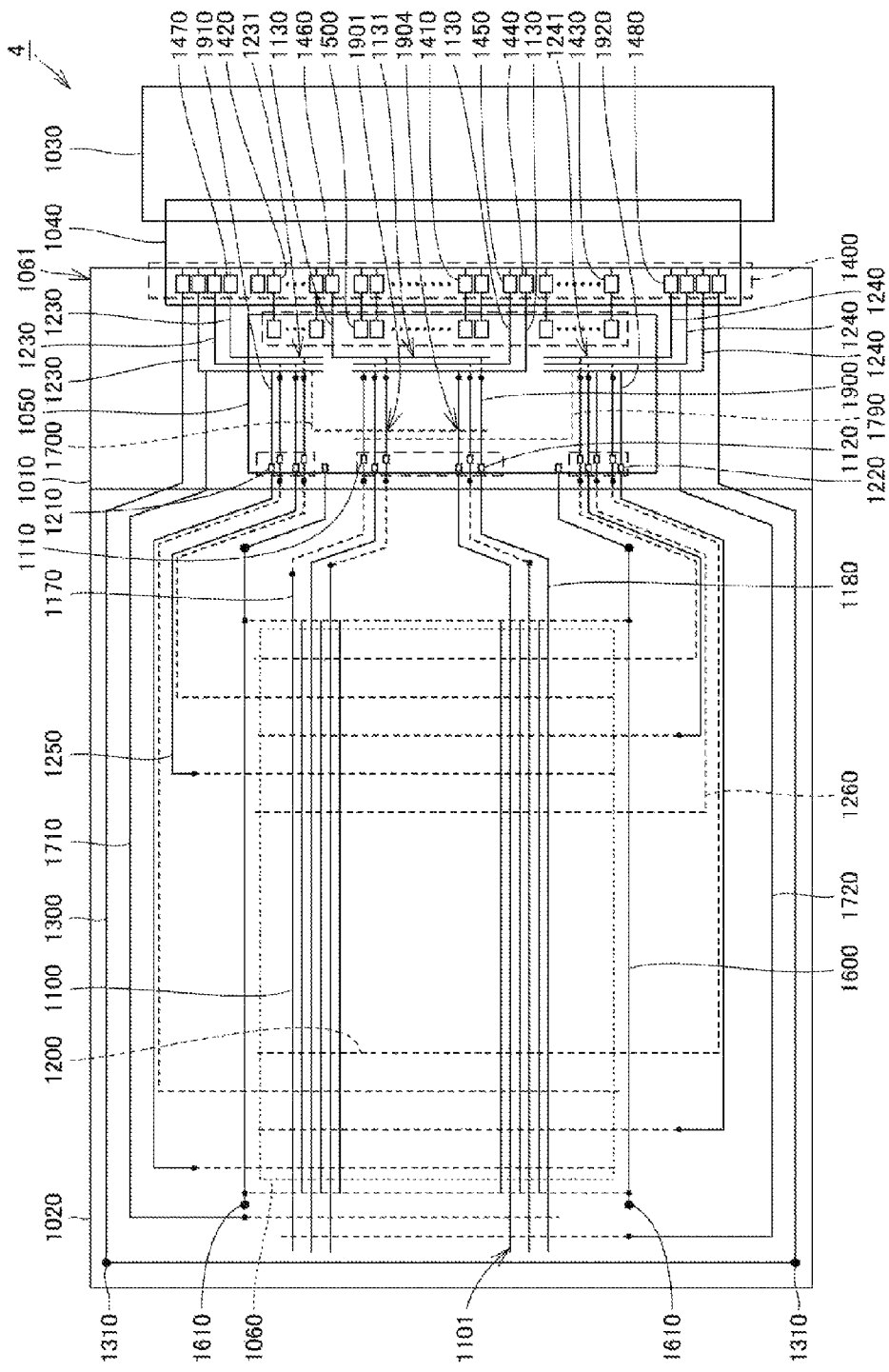
FIG. 14 is a plan view showing a configuration of an active matrix display device according to Embodiment 4 of the present invention.

FIG. 14 is a plan view showing a configuration of an active matrix display device according Embodiment 4 of the present invention. In FIG. 14, wiring lines formed in the gate electrode layer of the TFTs are depicted with solid lines, and wiring lines formed in the source/drain electrode layer of the TFTs are depicted with dotted lines.

As shown in FIG. 14, the active matrix display device 4 according to Embodiment 4 of the present invention includes an active matrix substrate 1010 and an opposite substrate 1020 facing the active matrix substrate 1010. A liquid crystal material that is not shown is sandwiched between the active matrix substrate 1010 and the opposite substrate 1020.

The active matrix display device 4 includes a driver 1050 mounted on the active matrix substrate 1010, and an FPC 1040 and a circuit substrate 1030, which are external substrates electrically connected to the active matrix substrate 1010.

In the active matrix display device 4 of the present embodiment, the active matrix substrate 1010 and the circuit substrate 1030 are electrically connected through the FPC 1040, but the active matrix substrate 1010 may be connected only to either the FPC 1040 or the circuit substrate 1030.

The active matrix substrate 1010 is provided with a display region 1060 located substantially in the center of the active matrix substrate 1010, and a terminal region 1061 located towards the right of FIG. 14 in which a plurality of input terminals are disposed. The terminal region 1061 is a region of the active matrix substrate 1010 that does not face the opposite substrate 1020 when the active matrix substrate 1010 and the opposite substrate 1020 are bonded together with the liquid crystal material, which is not shown, therebetween.

In the active matrix substrate 1010, gate wiring lines 1100 that are a plurality of first wiring lines extending in parallel with each other in at least the display region 1060, and source wiring lines 1200 that are a plurality of second wiring lines that extend in parallel with each other in the display region 1060 and intersect with the plurality of gate wiring lines 1100 across an insulating film are provided. The insulating film is made of a material such as $SiN_X$ or $SiO_X$.

FIG. 14 only shows some of the plurality of gate wiring lines 1100 and plurality of source wiring lines 1200. The respective numbers of gate wiring lines 1100 and source wiring lines 1200 are appropriately set.

Besides the plurality of gate wiring lines 1100 and the plurality of source wiring lines 1200, the display region 1060 also has formed therein storage capacitance wiring lines. The storage capacitance wiring lines are formed in the display region 1060 so as to be parallel to the plurality of gate wiring lines 1100.

In each of the intersections between the plurality of gate wiring lines 1100 and the plurality of source wiring lines 1200, a switching element such as a TFT or an MIM (metal insulator metal) that is not shown, a pixel electrode (R, G, or B), which is not shown, connected to the switching element, and the like are formed.

The terminal region 1061 is located outside of the display region 1060 on one end (right side of the drawing) of the plurality of gate wiring lines 1100. A plurality of upper gate terminals 1110 and a plurality of lower gate terminals 1120 that are a plurality of first transmission terminals that respectively send a signal from the driver 1050 to the plurality of gate wiring lines 1100 are provided in the terminal region 1061 towards the display region 1060. The plurality of upper gate terminals 1110 and the plurality of lower gate terminals 1120 are aligned in the extension direction of the plurality of source wiring lines 1200.

In order to connect the driver 1050 to the terminal region 1061, it is possible to use the COG (chip on glass) method. The driver 1050 is provided with a first driver circuit and a second driver circuit that supply signals to the source wiring lines 1200.

The first driver circuit is electrically connected to the plurality of second lead-out wiring lines 1250, and supplies a signal to at least some of a plurality of source wiring lines 1200. The second driver circuit is electrically connected to the plurality of third lead-out wiring lines 1260, and supplies a signal to at least some of the remaining plurality of source wiring lines 1200. However, the form of the first driver circuit and the second driver circuit is not limited thereto, and at least one of them may be formed monolithically on the active matrix substrate 1010.

A plurality of upper source terminals 1210 and a plurality of lower source terminals 1220 that are a plurality of second transmission terminals that respectively send signals from the driver 1050 to the plurality of source wiring lines 1200 are provided in the terminal region 1061 towards the display region 1060. The plurality of upper source terminals 1210 and the plurality of lower source terminals 1220 are aligned in the extension direction of the plurality of source wiring lines 1200.

The plurality of upper gate terminals 1110, the plurality of lower gate terminals 1120, and one end of the plurality of gate wiring lines 1100 are respectively connected to a plurality of upper first lead-out wiring lines 1170 and a plurality of lower first lead-out wiring lines 1180 that are a plurality of first lead-out wiring lines. For ease of description, the upper gate terminals 1110 and the lower gate terminals 1120 will be described separately, but functionally, the upper gate terminals 1110 and the lower gate terminals 1120 are the same type of terminal.

Specifically, the plurality of upper gate terminals 1110 and the plurality of gate wiring lines 1100 are connected to each other by the plurality of upper first lead-out wiring lines 1170 such that one upper gate terminal 1110 corresponds to one gate wiring line 1100.

Also, the plurality of lower gate terminals 1120 and the plurality of gate wiring lines 1100 are connected to each other by the plurality of lower first lead-out wiring lines 1180 such that one lower gate terminal 1120 corresponds to one gate wiring line 1100.

The plurality of upper source terminals 1210 and one end of some of the plurality of source wiring lines 1200 are respectively connected to each other by the plurality of second lead-out wiring lines 1250. The plurality of lower source terminals 1220 and another end of the remaining plurality of source wiring lines 1200 that are not connected to the plurality of second lead-out wiring lines 1250 are connected to each other by the plurality of third lead-out wiring lines 1260.

In the present embodiment, some of the plurality of source wiring lines 1200 and the remainder of the plurality of source wiring lines 1200 are formed alternately and parallel to each other. However, the connective configuration of the gate wiring lines and the lead-out wiring lines is not limited to what was described above; some of the plurality of source wiring lines 1200 may be source wiring lines located on the left half of the display region 1060, and the remaining plurality of source wiring lines 1200 may be source wiring lines located on the right half of the display region 1060, for example.

The plurality of upper source terminals 1210 and the plurality of source wiring lines 1200 are connected to each other by the plurality of second lead-out wiring lines 1250 such that one upper source terminal 1210 corresponds to one source wiring line 1200.

Also, the plurality of lower source terminals 1220 and the plurality of source wiring lines 1200 are connected to each other by the plurality of third lead-out wiring lines 1260 such that one lower source terminal 1220 corresponds to one source wiring line 1200.

A plurality of output terminals 1500 that output a signal to the driver 1050 are provided in the terminal region 1061, on the side thereof opposite to the display region 1060. The plurality of output terminals 1500 are aligned in the extension direction of the plurality of source wiring lines 1200.

A group of terminals 1400 including a plurality of input terminals 1410 that input signals from the FPC 1040 or the circuit substrate 1030 is provided in the terminal region 1061, on the side thereof opposite to the display region 1060 when viewed from the plurality of output terminals 1500. The plurality of input terminals 1410 are aligned in the extension direction of the plurality of source wiring lines 1200.

The group of terminals 1400 includes a plurality of first common wiring line terminals 1440, 1450, and 1460 for inputting signals through the plurality of upper gate terminals 1110 and the plurality of lower gate terminals 1120.

Specifically, the first common wiring line terminal 1440, the first common wiring line terminal 1450, the plurality of input terminals 1410, and the first common wiring line terminal 1460 are provided in that order from the lower side of FIG. 14.

Also, the group of terminals 1400 includes a plurality of second common wiring line terminals 1470 for inputting signals through the upper source terminals 1210 connected to the second lead-out wiring lines 1250. Furthermore, the group of terminals 1400 includes a plurality of third common wiring line terminals 1480 for inputting signals through the lower source terminals 1220 connected to the third lead-out wiring lines 1260.

The plurality of first common wiring line terminals 1440, 1450, and 1460 are respectively connected to the plurality of first common wiring lines 1130. Each of the plurality of first common wiring lines 1130 has a first extension portion 1131 that extends so as to separate the plurality of upper gate terminals 1110 and plurality of lower gate terminals 1120 from the plurality of output terminals 1500.

The plurality of second common wiring line terminals 1470 are respectively connected to the plurality of second common wiring lines 1230. Each of the plurality of second common wiring lines 1230 has a second extension portion 1231 that extends so as to separate the plurality of upper source terminals 1210 from the plurality of output terminals 1500.

The plurality of third common wiring line terminals 1480 are respectively connected to the plurality of third common wiring lines 1240. Each of the plurality of third common wiring lines 1240 has a third extension portion 1241 that extends so as to separate the plurality of lower source terminals 1220 from the plurality of output terminals 1500.

Also, the group of terminals 1400 includes a plurality of input terminals 1410, 1420, and 1430 respectively connected to the plurality of output terminals 1500.

In the present embodiment, three first common wiring lines 1130 are provided, and the plurality of first common wiring line terminals 1440, 1450, and 1460 are each connected to one first common wiring line 1130.

Three second common wiring lines 1230 are provided, and three second common wiring line terminals 1470 are each connected to one second common wiring line 1230. Three third common wiring lines 1240 are provided, and three third common wiring line terminals 1480 are each connected to one third common wiring line 1240.

Between each of the plurality of upper gate terminals 1110 and plurality of lower gate terminals 1120, and first extension portions 1131 of the plurality of first common wiring lines 1130, a plurality of first connecting wiring lines 1900 that are a plurality of connecting wiring lines are provided. During image scanning of the display region 1060, the plurality of first connecting wiring lines 1900 and the plurality of first common wiring lines 1130 are electrically connected.

Between each of the plurality of upper source terminals 1210 and the second extension portions 1231 of the plurality of second common wiring lines 1230, a plurality of second connecting wiring lines 1910 that are a plurality of connecting wiring lines are provided. During image scanning of the display region 1060, the plurality of second connecting wiring lines 1910 and the plurality of second common wiring lines 1230 are electrically connected.

Between each of the plurality of lower source terminals 1220 and the third extension portions 1241 of the plurality of third common wiring lines 1240, a plurality of third connecting wiring lines 1920 that are a plurality of connecting wiring lines are provided. During image scanning of the display region 1060, the plurality of third connecting wiring lines 1920 and the plurality of third common wiring lines 1240 are electrically connected.

In the present embodiment, three first connecting wiring lines 1900 respectively connected to three upper gate terminals 1110 are each connected to different first common wiring lines 1130. Three first connecting wiring lines 1900 respectively connected to three lower gate terminals 1120 are each connected to different first common wiring lines 1130.

The three first common wiring lines 1130, after extending in the extension direction of the plurality of gate wiring lines 1100 from the three first common wiring line terminals 1440, 1450, and 1460 connected to the first common wiring lines 1130, change direction so as to extend in the extension direction of the plurality of source wiring lines 1200.

Three second connecting wiring lines 1910 respectively connected to three upper gate terminals 1210 are each connected to different second common wiring lines 1230. Three third connecting wiring lines 1920 respectively connected to three lower source terminals 1220 are each connected to different third common wiring lines 1240.

The three second common wiring lines 1230, after extending in the extension direction of the plurality of gate wiring lines 1100 from the three second common wiring line terminals 1470 connected to the second common wiring lines 1230, change direction so as to extend in the extension direction of the plurality of source wiring lines 1200.

The three third common wiring lines 1240, after extending in the extension direction of the plurality of gate wiring lines 1100 from the three third common wiring line terminals 1480 connected to the third common wiring lines 1240, change direction so as to extend in the extension direction of the plurality of source wiring lines 1200.

A first auxiliary wiring line 1700 that intersects with the second common wiring lines 1230 across an insulating film between the plurality of upper gate terminals 1110 and plurality of lower gate terminals 1120, and the plurality of output terminals 1500, and that intersects with the plurality of first connecting wiring lines 1900 across an insulating film is provided. The insulating film is made of the same material as the gate insulating film and is made of a material such as $SiN_X$ or $SiO_X$, for example.

In the present embodiment, one first auxiliary wiring line 1700 is provided, and the one first auxiliary wiring line 1700, after extending in the extension direction of the plurality of gate wiring lines 1100 from the second extension portions 1231 of the one second common wiring line 1230 intersecting with the first auxiliary wiring line 1700, changes direction so as to extend in the extension direction of the plurality of source wiring lines 1200.

The plurality of gate wiring lines 1100 have a plurality of redundant portions 1101 located on the other end of the gate wiring lines 1100 (left side of FIG. 14), outside of the display region 1060. On the active matrix substrate 1010, a second auxiliary wiring line 1710 is formed, the second auxiliary wiring line 1710 intersecting with any of the plurality of redundant portions 1101 through an insulating film, the second auxiliary wiring line 1710 being located outside of the path in which the plurality of second lead-out wiring lines 1250 and the second common wiring line terminals 1470 are electrically connected, the second auxiliary wiring line 1710 being able to be electrically connected to the second common wiring line terminals 1470. In other words, the second auxiliary wiring line 1710 is located outside of the plurality of second lead-out wiring lines 1250 and the first driver circuit in a plan view.

In the present embodiment, the second auxiliary wiring lines 1710 are connected to one second common wiring line 1230. The second auxiliary wiring line 1710 intersects with the redundant portions 1101 of all the gate wiring lines 1100 across an insulating film.

Also, a third auxiliary wiring line 1790 that intersects with the third common wiring lines 1240 across an insulating film between the plurality of upper gate terminals 1110 and plurality of lower gate terminals 1120, and the plurality of output terminals 1500, and that intersects with any of the plurality of first connecting wiring lines 1900 across an insulating film is provided.

In the present embodiment, one third auxiliary wiring line 1790 is provided, and the one third auxiliary wiring line 1790, after extending in the extension direction of the plurality of gate wiring lines 1100 from the third extension portions 1241 of the one third common wiring line 1240 intersecting with the third auxiliary wiring line 1790, changes direction so as to extend in the extension direction of the plurality of source wiring lines 1200.

On the active matrix substrate 1010, a fourth auxiliary wiring line 1720 is formed, the fourth auxiliary wiring line 1720 intersecting with any of the plurality of redundant portions 1101 across an insulating film, the fourth auxiliary wiring line 1720 being present outside of the path where the plurality of third lead-out wiring lines 1260 are electrically connected to the third common wiring line terminals 1480, the fourth auxiliary wiring line 1720 being able to be electrically connected to the third common wiring line terminals 1480. In other words, the fourth auxiliary wiring line 1720 is located outside of the plurality of third lead-out wiring lines 1260 and the second driver circuit in a plan view.

In the present embodiment, one fourth auxiliary wiring line 1720 is connected to one third common wiring line 1240. Also, the one fourth auxiliary wiring line 1720 intersects with the redundant portions 1101 of all gate wiring lines 1100 through an insulating film.

An auxiliary capacitance wiring line 1600 is provided so as to surround the display region 1060. Transfer pads 1610 are also connected to the auxiliary capacitance wiring line 1600.

A common electrode wiring line 1300 is provided so as to surround the second auxiliary wiring line 1710 and the fourth auxiliary wiring line 1720. Common electrode terminals included in the group of terminals 1400 are connected to the common electrode wiring line 1300. Transfer pads 1310 are also connected to the common electrode wiring line 1300.

The transfer pads 1310 are connected to a common electrode, which is not shown, formed on the opposite substrate 1020. In this manner, a common voltage can be applied to the common electrode formed on the opposite substrate 1020 from common electrode terminals. The common electrode does not necessarily need to be provided on the opposite substrate 1020, and in a liquid crystal device using transverse electric fields, for example, the common electrode is provided on the active matrix substrate 1010.

In the configuration above, after a step of repair is performed by radiating a laser beam, a disconnected portion that is an obstructing portion is formed by radiating a laser beam on the first connecting wiring line 1900, the second connecting wiring line 1910, and the third connecting wiring line 1920.

At this time, a plurality of intersections 1901 where the first auxiliary wiring line 1700 and the plurality of first connecting wiring lines 1900 intersect are located on the side of the disconnected portions towards the plurality of upper gate terminals 1110 and the plurality of lower gate terminals 1120, the disconnected portions being formed in each of the plurality of first connecting wiring lines 1900.

A plurality of intersections 1904 where the third auxiliary wiring line 1790 and the plurality of first connecting wiring lines 1900 intersect are located on the side of the disconnected portions towards the plurality of upper gate terminals 1110 and the plurality of lower gate terminals 1120, the disconnected portions being formed in each of the plurality of first connecting wiring lines 1900.

According to the configuration above, it is possible to repair the gate wiring lines 1100. In liquid crystal modules used in products such as digital cameras and printers, there are cases in which the driver 1050 is mounted on the signal input side of the gate wiring lines 1100 as in the present embodiment. The present invention can be applied even in such cases.

It is naturally assumed in the present invention that it is possible to appropriately combine respective components of the embodiments above that can be combined.

The embodiments disclosed herein are examples in every respect and are not limiting. The scope of the present invention is defined by the claims, rather than the above descriptions, and includes all modifications having equivalent meaning to the claims and made within the scope of the claims.

DESCRIPTION OF REFERENCE CHARACTERS 1, 2, 3, 3a, 4 active matrix display device
10, 1010 active matrix substrate
20, 1020 opposite substrate
30, 1030 circuit substrate 50, 1050 driver
60, 1060 display region
61, 1061 terminal region
70 disconnection
80 target
91 disconnected portion
100, 1200 source wiring line
101, 1101 redundant portion
102 right-side group of source wiring lines
103 left-side group of source wiring lines
110 right-side source terminal
120 left-side source terminal
130, 1130 first common wiring line
130B blue pixel common wiring line
130G green pixel common wiring line
130R red pixel common wiring line
131, 1131 first extension portion
170, 180, 1170, 1180 first lead-out wiring line
200, 1100 gate wiring line
210 right-side gate terminal
220 left-side gate terminal
230, 1230 second common wiring line
231, 1231 second extension portion
240, 1240 third common wiring line
241, 1241 third extension portion
250, 1250 second lead-out wiring line
260, 1260 third lead-out wiring line
300, 1300 common electrode wiring line
310, 610, 1310, 1610 transfer pad
400, 1400 group of terminals
410, 420, 430, 1410, 1420, 1430 input terminal
440, 450, 460, 1440, 1450, 1460 first common wiring line terminal
470, 1470 second common wiring line terminal
480, 1480 third common wiring line terminal
500, 1500 output terminal
600, 1600 auxiliary capacitance wiring line
700, 730, 731, 732, 733, 743, 1700 first auxiliary wiring line
710, 760, 761, 762, 763, 1710 second auxiliary wiring line
720, 721, 722, 770, 771, 772, 773, 1720 fourth auxiliary wiring line
723, 724 contact hole
740, 741, 742, 743, 790, 791, 792, 1790 third auxiliary wiring line
900, 1900 first connecting wiring line
901, 904, 1901, 1904 intersection
902, 903 group of first connecting wiring lines
910, 1910 second connecting wiring line
920, 1920 third connecting wiring line
1110 upper gate terminal
1120 lower gate terminal
1210 upper source terminal
1220 lower source terminal

The invention claimed is:

1. An active matrix display device, comprising:
an active matrix substrate;
a driver mounted on the active matrix substrate; and
an external substrate electrically connected to the active matrix substrate,
wherein the active matrix substrate includes:
a plurality of first wiring lines that extend in parallel with each other in at least a display region;
a plurality of second wiring lines that extend in parallel with each other in the display region, and that intersect with the plurality of first wiring lines across an insulating film;
a plurality of first transmission terminals that are located in a portion of a terminal region adjacent to the display region, the terminal region being located outside of the display region on one end of the plurality of first wiring lines, the plurality of first transmission terminals being aligned in an extension direction of the plurality of second wiring lines and sending a signal from the driver to the respective plurality of first wiring lines;
a plurality of second transmission terminals that are located in a portion of the terminal region adjacent to the display region, the terminal region being located outside of the display region on the one end of the plurality of first wiring lines, the plurality of second transmission terminals being aligned in the extension direction of the plurality of second wiring lines and sending a signal from the driver to the respective plurality of second wiring lines;
a plurality of first lead-out wiring lines that respectively connect the one end of the plurality of first wiring lines to the plurality of first transmission terminals;
a plurality of second lead-out wiring lines that respectively connect one end of at least some of the plurality of second wiring lines to the second transmission terminals;
a first driver circuit that is electrically connected to the plurality of second lead-out wiring lines, and that supplies a signal to said at least some of the plurality of second wiring lines;
a plurality of output terminals located in the terminal region opposite to where the display region is located, the plurality of output terminals outputting a signal to the driver;
a group of terminals located in the terminal region opposite to where the display region is located, the group of terminals including a plurality of input terminals to which a signal from the external substrate is inputted;
a first common wiring line terminal included in the group of terminals by which a signal passing through the plurality of first transmission terminals is inputted;
a second common wiring line terminal, included in the group of terminals by which a signal passing through the plurality of second transmission terminals, which are connected to the second lead-out wiring lines, is inputted;
a first common wiring line connected to the first common wiring line terminal, the first common wiring line having a first extension portion that extends between the plurality of first transmission terminals and the plurality of output terminals;
a second common wiring line connected to the second common wiring line terminal, the second common wiring line having a second extension portion that extends between the plurality of second transmission terminals that are connected to the second lead-out wiring lines and the plurality of output terminals;
a plurality of first connecting wiring lines provided between the respective plurality of first transmission terminals and the first extension portion of the first common wiring line;
a plurality of second connecting wiring lines provided between the respective plurality of second transmission terminals connected to the second lead-out wiring lines, and the second extension portion of the second common wiring line;
a first auxiliary wiring line that intersects with the second common wiring line across the insulating film, and that intersects with any of the plurality of first connecting wiring lines across the insulating film; and a second auxiliary wiring line that intersects, across the insulating film, with any of a plurality of redundant portions that are portions located outside of the display region on another side of the respective plurality of first wiring lines, that are located outside of the plurality of second lead-out wiring lines and the first driver circuit in a plan view, and that connects electrically with the second common wiring line or intersects with the second common wiring line through the insulating film, wherein the plurality of first connecting wiring lines respectively have first obstructing portions therein that block an electrical connection between the plurality of first transmission terminals and the first common wiring line, wherein the plurality of second connecting wiring lines respectively have second obstructing portions therein that block an electrical connection between the plurality of second transmission terminals that are connected to the second lead-out wiring lines, and the second common wiring line, and wherein a plurality of intersections where the first auxiliary wiring line and the plurality of first connecting wiring lines intersect are located in each of the plurality of first connecting wiring lines closer to the plurality of first transmission terminals than the first obstructing portions are.

2. The active matrix display device according to claim 1, wherein the active matrix substrate further includes:

a plurality of third lead-out wiring lines connected to another end of at least some of the remaining plurality of second wiring lines that are not connected to the plurality of second lead-out wiring lines;

a second driver circuit that is electrically connected to the plurality of third lead-out wiring lines, and that supplies a signal to said at least some of the remaining plurality of second wiring lines;

a third common wiring line terminal included in the group of terminals that inputs a signal through the plurality of second transmission terminals connected to the third lead-out wiring lines;

a third common wiring line connected to the third common wiring line terminal, the third common wiring line having a third extension portion that extends between the plurality of second transmission terminals that are connected to the third lead-out wiring lines and the plurality of output terminals;

a plurality of third connecting wiring lines that are provided between the respective plurality of second transmission terminals connected to the third lead-out wiring lines, and the third extension portion of the third common wiring line;

a third auxiliary wiring line that intersects with the third common wiring line across the insulating film, and that intersects with any of the plurality of first connecting wiring lines across the insulating film; and a fourth auxiliary wiring line that intersects with any of the plurality of redundant portions located outside the display region across the insulating film, the redundant portions being portions on another end of the respective plurality of first wiring lines, the fourth auxiliary wiring line being located outside of the plurality of third lead-out wiring lines and the second driver circuit in a plan view and being connected electrically to the third common wiring line or intersecting with the third common wiring line through the insulating film, and wherein the plurality of third connecting wiring lines respectively have third obstructing portions therein that block an electrical connection between the plurality of second transmission terminals connected to the third lead-out wiring lines, and the third common wiring line.

3. The active matrix display device according to claim 2, wherein a first connecting wiring line of the plurality of first connecting wiring lines connected to a first wiring line having a disconnection among the plurality of first wiring lines is electrically connected to the third auxiliary wiring line that intersects with the first connecting wiring line by removing a portion of the insulating film interposed therebetween, wherein the third auxiliary wiring line electrically connected to the first connecting wiring line is electrically connected to the third common wiring line that intersects with the third auxiliary wiring line by removing a portion of the insulating film interposed therebetween, wherein the third common wiring line electrically connected to the third auxiliary wiring line is electrically connected to the fourth auxiliary wiring line, wherein the fourth auxiliary wiring line is electrically connected to any of the plurality of redundant portions by removing a portion of the insulating film interposed therebetween, and wherein a signal of the driver inputted from the first transmission terminals is transmitted to one end and another end of the first wiring line among the plurality of first wiring lines that is electrically connected to the first connecting wiring line connected to the third auxiliary wiring line.

4. The active matrix display device according to claim 2, wherein the second auxiliary wiring line and the fourth auxiliary wiring line respectively intersect with mutually exclusive different groups of the plurality of redundant portions across the insulating film.

5. The active matrix display device according to claim 1, wherein the active matrix substrate has a plurality of said first common wiring line terminals and a plurality of said first common wiring lines, and wherein the plurality of first common wiring lines are respectively connected to the plurality of first common wiring line terminals, the first common wiring lines each having the first extension portion that extends between the plurality of first transmission terminals and the plurality of output terminals.

6. The active matrix display device according to claim 1, wherein the second auxiliary wiring line is connected to the second common wiring line or intersects therewith across the insulating film.

7. The active matrix display device according to claim 1, wherein the first obstructing portions are configured by providing disconnected portions in the respective plurality of first connecting wiring lines.

8. The active matrix display device according to claim 1, wherein a first connecting wiring line of the plurality of first connecting wiring lines connected to a first wiring line having a disconnection among the plurality of first wiring lines is electrically connected to the first auxiliary wiring line that intersects with the first connecting wiring line by removing a portion of the insulating film interposed therebetween, wherein the first auxiliary wiring line electrically connected to the first connecting wiring line is electrically connected to the second common wiring line that intersects with the first auxiliary wiring line by removing a portion of the insulating film interposed therebetween, wherein the second common wiring line electrically connected to the first auxiliary wiring line is electrically connected to the second auxiliary wiring line, wherein the second auxiliary wiring line is electrically connected to any of the plurality of redundant portions by removing a portion of the insulating film interposed therebetween, and wherein a signal of the driver inputted from the first transmission terminals is transmitted to one end and another end of the first wiring line among the plurality of first wiring lines that is electrically connected to the first connecting wiring line connected to the first auxiliary wiring line.

\* \* \* \* \*